United States Patent
Hiranuma

(10) Patent No.: US 9,621,861 B2
(45) Date of Patent: Apr. 11, 2017

(54) PROJECTION IMAGE DISPLAY SYSTEM, PROJECTION IMAGE DISPLAY METHOD, AND PROJECTION-TYPE DISPLAY APPARATUS

(71) Applicant: Panasonic Intellectual Property Management Co., Ltd., Osaka-shi, Osaka (JP)

(72) Inventor: Yoshinao Hiranuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 240 days.

(21) Appl. No.: 14/548,052

(22) Filed: Nov. 19, 2014

(65) Prior Publication Data
US 2015/0138240 A1    May 21, 2015

(30) Foreign Application Priority Data

Nov. 21, 2013   (JP) .................................. 2013-240513
Nov. 12, 2014   (JP) .................................. 2014-230109

(51) Int. Cl.
*G03B 21/14*        (2006.01)
*H04N 9/31*         (2006.01)

(52) U.S. Cl.
CPC ......... *H04N 9/3147* (2013.01); *H04N 9/3185* (2013.01); *H04N 9/3194* (2013.01); *G03B 21/147* (2013.01)

(58) Field of Classification Search
CPC .. H04N 9/3147; H04N 9/3185; G03B 21/147; G03B 21/14; G03B 21/145; G03B 21/26
(Continued)

(56) References Cited

U.S. PATENT DOCUMENTS

| | | | |
|---|---|---|---|
| 6,753,923 B2* | 6/2004 | Gyoten | H04N 9/3147 348/383 |
| 2005/0168705 A1* | 8/2005 | Li | H04N 5/74 353/69 |
| 2009/0201431 A1 | 8/2009 | Izumida | |

FOREIGN PATENT DOCUMENTS

| | | |
|---|---|---|
| JP | 2001-238152 | 8/2001 |
| JP | 4574819 B | 3/2002 |

(Continued)

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A projection image display system which forms an image on a projection plane with plural images includes a first projection-type display apparatus, a second projection-type display apparatus, a first-controller configured to control the first projection-type display apparatus to display a guide figure when a projectable region does not contain an assigned projection region for the first projection-type display apparatus, a second controller configured to control the second projection-type display apparatus to display a reference figure when a projectable region contains an assigned projection region for the second projection-type display apparatus. The guide figure is a figure to be referenced by a user for adjusting the position of the first projection-type display apparatus. The reference figure is a figure to be referenced by the user, as a norm for the position adjustment, in combination with the guide figure.

9 Claims, 21 Drawing Sheets

(58) Field of Classification Search
USPC .................................................. 353/69, 70
See application file for complete search history.

(56) References Cited

FOREIGN PATENT DOCUMENTS

| | | |
|---|---|---|
| JP | 2005-244955 | 9/2005 |
| JP | 2006-304100 | 11/2006 |
| JP | 2007-202177 | 8/2007 |
| JP | 2009-200613 | 9/2009 |
| JP | 2009-219102 | 9/2009 |
| JP | 2009-290851 | 12/2009 |
| JP | 2012-199772 | 10/2012 |

* cited by examiner

Fig. 8

| PROJECTOR NO. | RANGE OF HORIZONTAL SHIFT | RANGE OF VERTICAL SHIFT | COORDINATES OF SHIFT POSITION | ZOOM RANGE | ZOOM MAGNIFICATION | COORDINATES OF OPTICAL AXIS |
|---|---|---|---|---|---|---|
| 1 | ±500 | ±300 | (100, 50) | 2.2 | 1.45 | (960, 720) |
| 2 | 0 | 0 | (0, 0) | 1.0 | 1.00 | — |
| 3 | ±400 | ±250 | (40, −200) | 1.6 | 1.20 | (960, 720) |

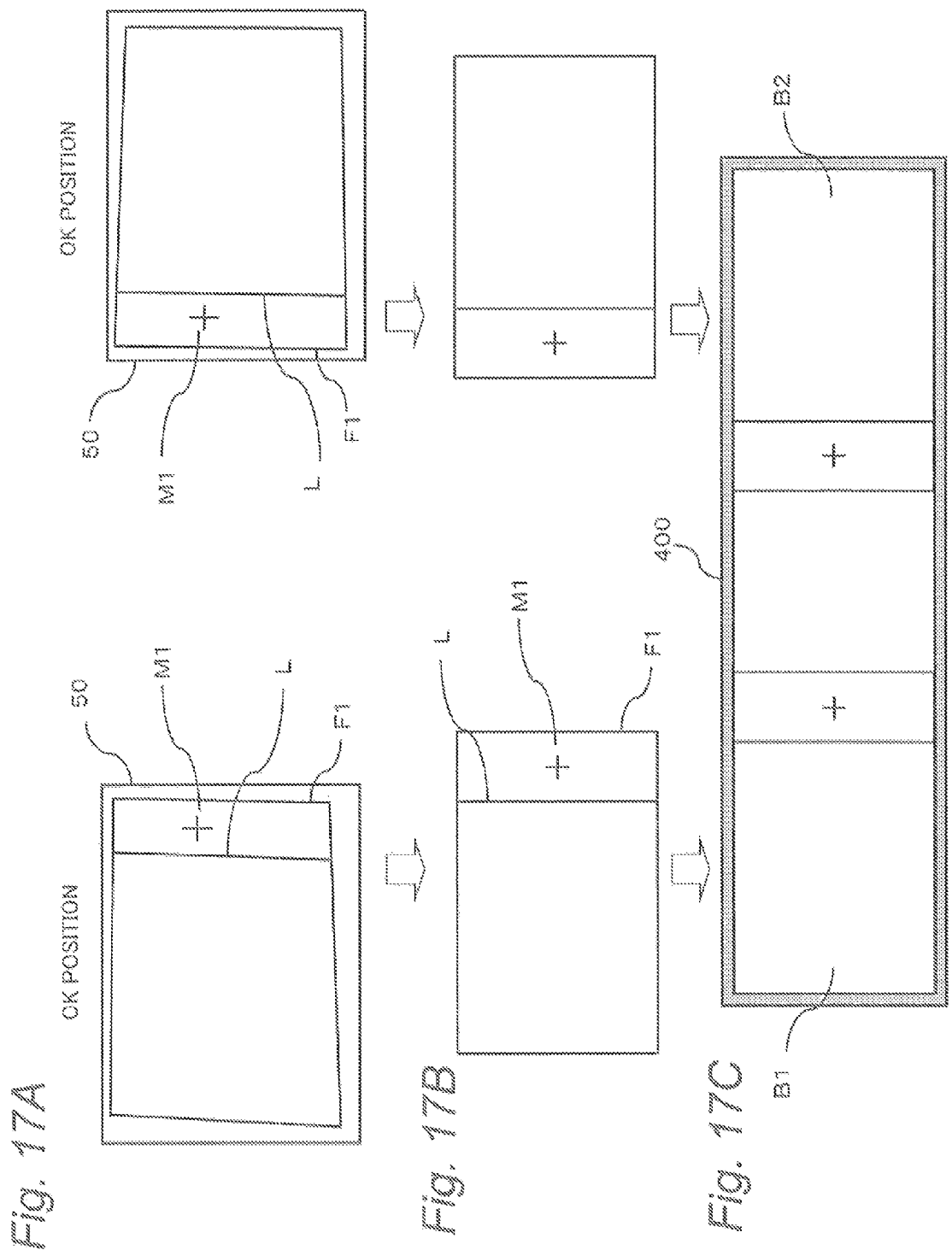

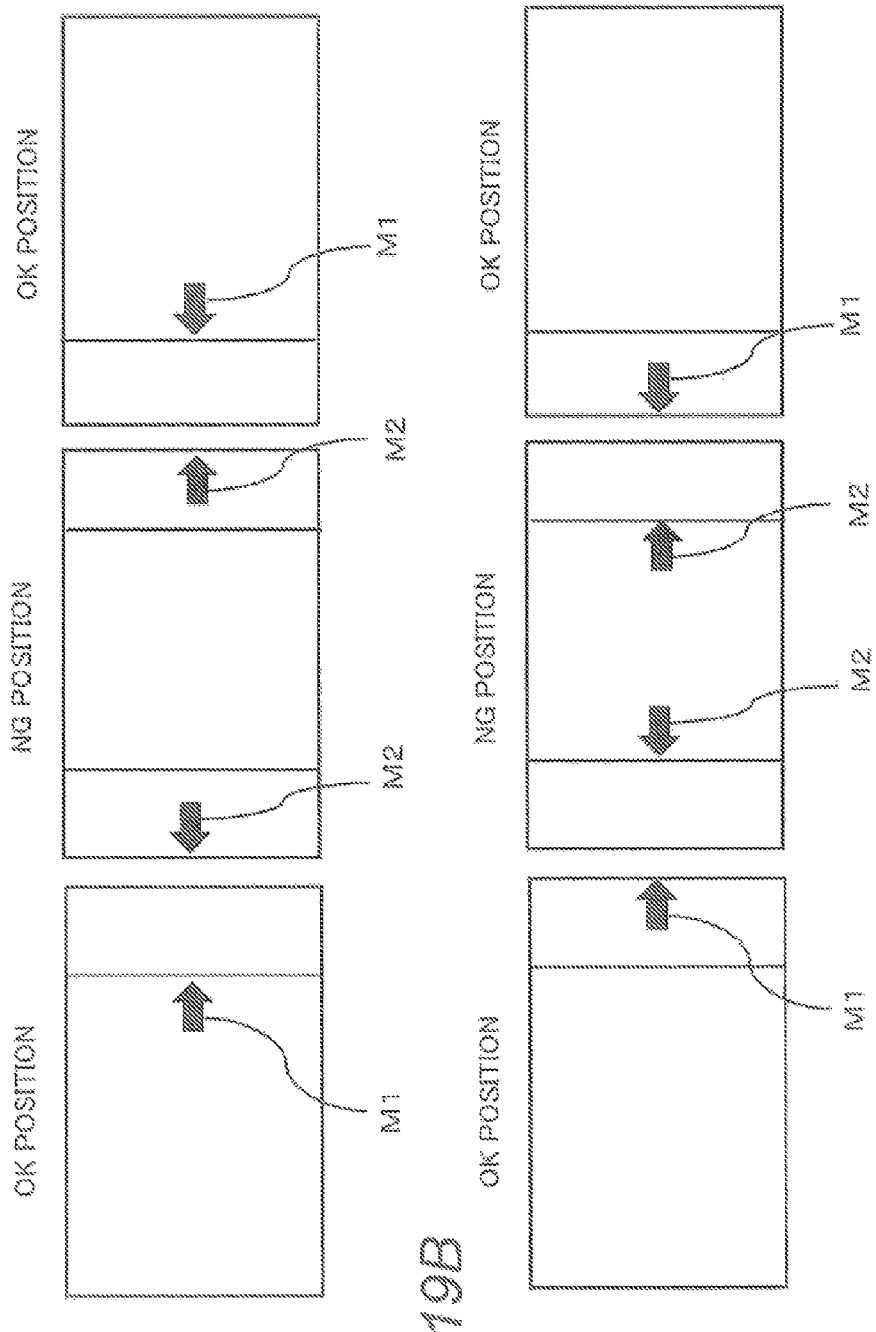

PROJECTION IMAGE DISPLAY SYSTEM, PROJECTION IMAGE DISPLAY METHOD, AND PROJECTION-TYPE DISPLAY APPARATUS

BACKGROUND

1. Technical Field

The present disclosure relates to a projection-type display apparatus that, projects an image onto a projection plane and a projection image display system capable of projecting an image of a desired shape onto a projection plane by using a plurality of the projection-type display apparatuses.

2. Related Art

JP 2007-202177 A discloses a multi-projection display that optically corrects a shape of a projection image based on a shape of a screen frame and a shape of the projection image. The multi-projection display includes a plurality of projectors each of which projects a unit image on a plane, an image capturing means for capturing an image of a predetermined range containing a screen (a projection plane) on which unit images are projected, a screen information detection means for detecting a shape of the screen, and a shape correction means capable of correcting a shape of the unit image based on information about the screen shape detected by the screen information detection means and information about the shape of the unit image obtained from the captured image. With that configuration, the multi-projection display is capable of projecting an image of which shape is adjusted to a shape close to the shape of the screen frame.

In the case where a plurality of projectors are used to project a single image as a whole on a plane like the multi-projection display disclosed in JP 2007-202177 A, it is required to arrange the plurality of projectors so that each of the projectors projects an image onto a predetermined position on the projection plane. If the projection position of the projector is out of the predetermined position, a user has to adjust a position of the projector, which is a bothersome task for the user.

The present disclosure provides a projection image display system for projecting an image on a plane by using a plurality of projection-type display apparatuses, which is capable of reducing burden of a user in a position adjustment of the projection-type display apparatus which is projecting an image out of a predetermined position.

SUMMARY

In a first aspect, a projection image display system is provided. The projection image display system forms an image on a projection plane by using a plurality of images projected from a plurality of projection-type display apparatuses is provided.

The plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region.

The projection image display system includes a first controller and a second controller. The first controller is configured to generate a guide figure and controls the first projection-type display apparatus to display the guide figure when a first projectable region does not contain the first assigned projection region, the first projectable region being a region on a projection plane, in which the first projection-type display apparatus can actually project an image. The second controller is configured to generate a reference figure and controls the second projection-type display apparatus to display the reference figure when a second projectable region contains the second assigned projection region, the second projectable region being a region on a projection plane, in which the second projection-type display apparatus can actually project an image.

The guide figure is a figure to be referenced by a user for adjusting the position of the first projection-type display apparatus. The reference figure is a figure to be referenced by the user, as a norm for the position adjustment, in combination with the guide figure.

In a second aspect, a projection-type display apparatus is provided. The projection-type display apparatus forms an image on a projection plane in cooperation with at least one other projection-type display apparatus, and is assigned displaying of an image on a partial region of the formed image. The projection-type display apparatuses includes:

a generation unit configured to generate a guide figure that is referenced by a user for adjusting the position of the projection-type display apparatus when a projectable region does not contain an assigned projection, the projectable region being a region on the projection plane in which the projection-type display apparatus can actually project an image, the assigned projection region being a region on the projection plane assigned to the projection-type display apparatus; and a projection unit configured to project, the guide figure on the projection plane.

In a third aspect, a control apparatus in a projection image display system is provided. The projection image display system forms an image on a projection plane by using a plurality of images projected from a plurality of projection-type display apparatuses.

The plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region, The control apparatus includes a first controller and a second controller. The first controller is configured to send a command, for displaying a guide figure to the first projection-type display apparatus when a first projectable region does not contain the first assigned projection region, the first projectable region being a region on a projection plane, in which the first projection-type display apparatus can actually project an image. The second controller is configured to send a command for displaying a reference figure to the second projection-type display apparatus when a second projectable region contains the second assigned projection region, the second projectable region being a region on a projection plane, in which the second projection-type display apparatus can actually project an image.

The guide figure is a figure to be referenced by a user for adjusting the position of the first, projection-type display apparatus, and the reference figure is a figure to be referenced by the user, as a norm for the position adjustment, in combination with the guide figure.

In a fourth aspect, an image display method for a projection image display system for forming an image on a projection plane by using a plurality of projection-type display apparatuses is provided.

The plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region.

The image display method includes controlling the first projection-type display apparatus to display a guide figure when a first projectable region does not contain the first assigned projection region, the first projectable region being a region on a projection plane, in which the first projection-type display apparatus can actually project an image, and controlling the second project ion-type display apparatus to display a reference figure when a second projectable region contains the second assigned projection region, the second projectable region being a region on a projection plane, in which the second projection-type display apparatus can actually project an image.

The guide figure is a figure to be referenced by a user for adjusting the position of the first projection-type display apparatus. The reference figure is a figure to be referenced by the user, as a norm for the position adjustment, in combination with the guide figure.

The projection image display system according to the present disclosure is capable of reducing a burden of a user in position adjustment of the projection-type display apparatus that is projecting an image out of a desired place.

BRIEF DESCRIPTION OF DRAWINGS

FIG. 8 is a diagram of data structure of the lens information;

FIGS. 17A to 17C are schematic diagrams for describing an operation of generating a reference figure for correcting a position of the projector;

FIGS. 19A and 19B are schematic diagrams for describing another exemplary method of displaying guide cursors and reference cursors;

DETAILED DESCRIPTION OF PREFERRED EMBODIMENT

Embodiments will be described in detail below with reference to the drawings as required. However, an excessively detailed description may be omitted. For example, a detailed description of an already well-known matter and a redundant description of substantially the same configuration may be omitted. All of such omissions are intended to prevent the description presented below from, being unnecessarily redundant and to facilitate understanding by those skilled in the art.

The inventor(s) of the present invention provides the accompanying drawings and the following description for those skilled in the art to fully understand the present disclosure, but does not intend to limit subject matters described in the claims to the accompanying drawings and the description below.

First Embodiment

First Embodiment is described below with reference to FIG. 1 to FIG. 18C.

1-1. Configuration 1-1-1. System Configuration

Figure 1:
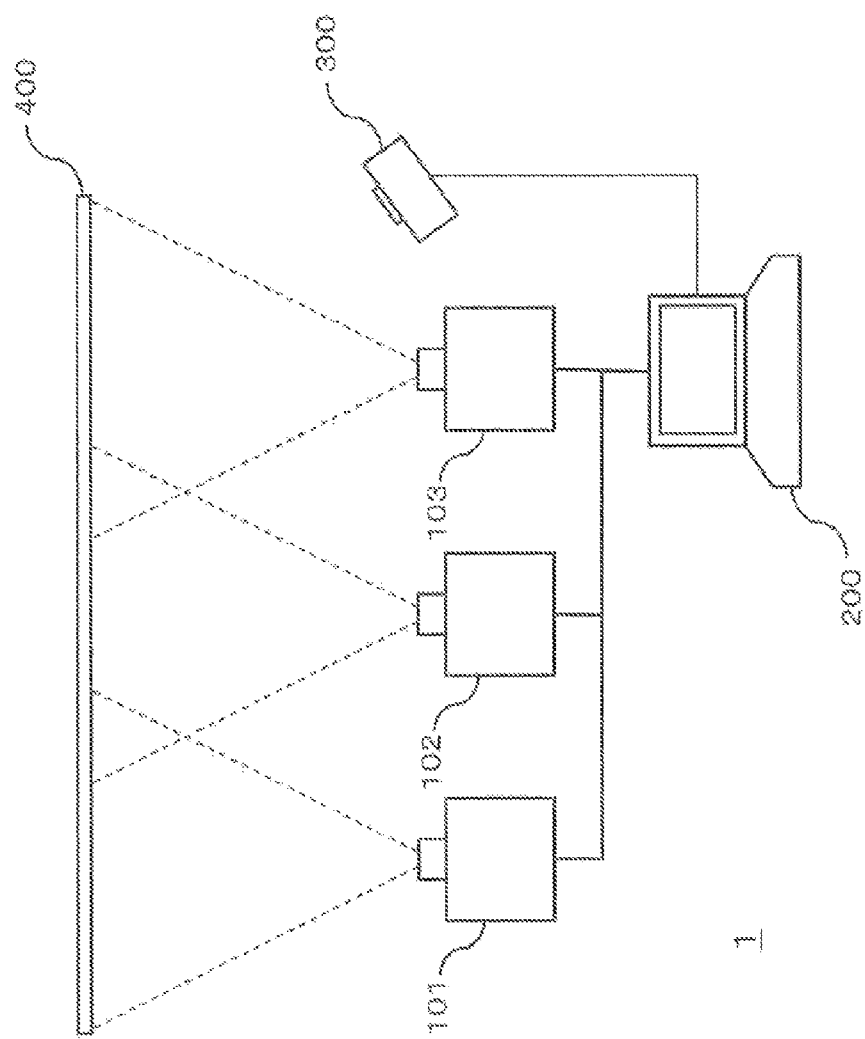
FIG. 1 is a schematic diagram illustrating projectors being connected with a network.

FIG. 1 is a schematic diagram illustrating a configuration of a projection image display system that includes a plurality of projectors (projection-type display apparatuses) according to the first embodiment. A projection image display system 1 includes a plurality of projectors 101, 102, and 103, an adjusting personal computer (PC) 200, and a camera (imaging apparatus) 300.

The plurality of projectors 101, 102, and 103 are connected with the adjusting PC 200 through LAN (Local Area Network) cables.

The plurality of projectors 101, 102, and 103 are arranged in front of a screen (projection plane) 400 so that they can project images on the screen 400. In this embodiment, the plurality of projectors 101, 102, and 103 are aligned side by side, i.e., in a horizontal direction. The whole projection region is divided into plural regions. Each divided region is assigned to each projector which projects an image onto each divided region. As a result, the projection image display system 1 can display an image even on the screen 400 that is extremely wide. Generally, in a case where an image is projected on a plane in the above described situation, a technique called "edge blending" is used. Edge blending is a technique to project images so that adjacent projection regions of the projectors partially overlap each other and of gradually cross-fading brightness of the images in the overlapping regions so that the resulting image appears seamless. Edge blending is also used by the projection image display system according to the present disclosure. In the description below, the width (size) of the overlapping region is referred to as "overlapping width."

The adjusting PC 200 sends commands to the projectors 101, 102, and 103 and the camera 300 to control these components. Further, as described later, the adjusting PC 200 performs acquisition of a projection state, calculation of correction data, and sending of the correction data to make the images projected from the projectors 101, 102, and 103 displayed within the screen 400.

The camera (imaging apparatus) 300 is arranged in front of the screen 400 so that it can capture an image of a predetermined region containing the whole screen 400. The camera 300 is connected with the adjusting PC 200 via a communication cable such as a USB cable. The camera 300 captures an image of a region containing the whole screen 400 according to an instruction from the adjusting PC 200 and sends the captured image data to the adjusting PC 200. The connection between the camera 300 and the adjusting PC 200 is not limited to a wired connection and may be a wireless communication such as a WiFi connection.

1-1-2. Configuration of the Projector

Figure 2:
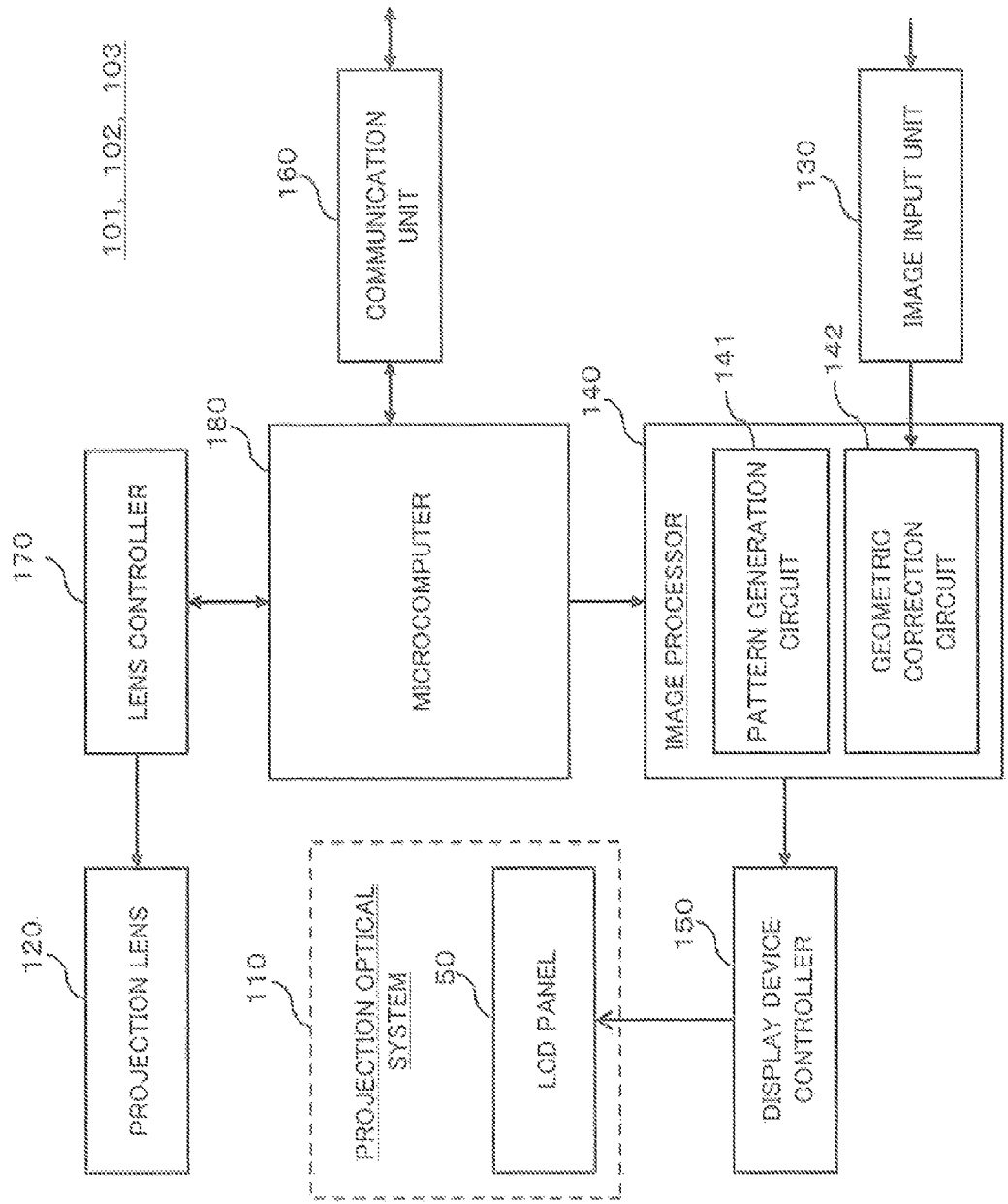
FIG. 2 is a block diagram illustrating a configuration of the projector.
Figure 3:
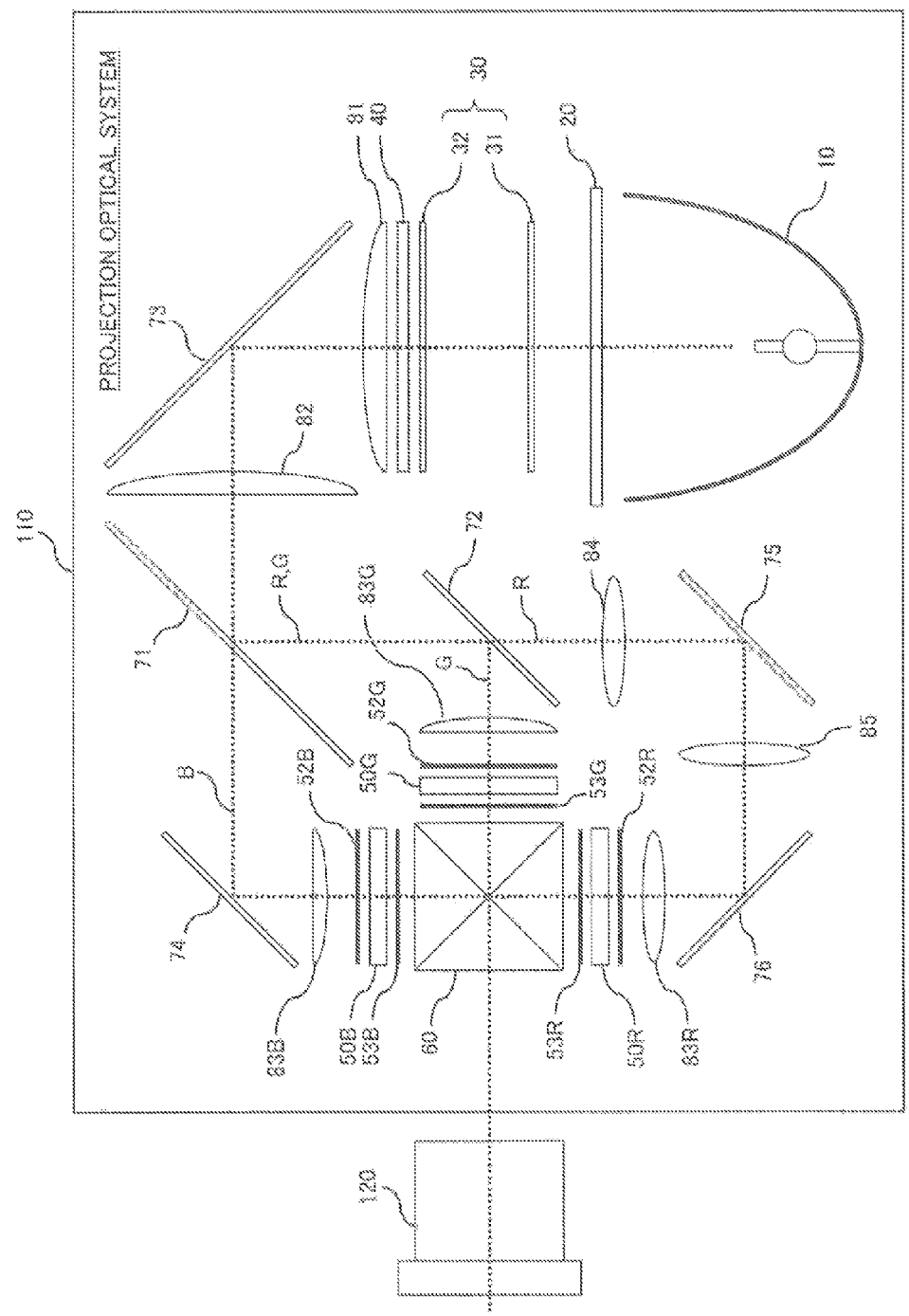
FIG. 3 is a schematic diagram illustrating a configuration of a projection optical system of the projector.

FIGS. 2 and 3 are diagrams illustrating a configuration of each of projectors 101, 102, and 103 in the first embodiment. In the first embodiment it is assumed that the projectors 101, 102, and 103 are identical in configuration and function.

As illustrated in FIG. 2, each of the projectors 101, 102, and 103 has a projection optical system 110 including a liquid crystal panel 50, a projection lens 120, an image input unit 130, an image processer 140, a display device controller 150, a communication unit 160, a lens controller 170, and a microcomputer 180.

FIG. 3 is a diagram illustrating details of a configuration of the projection optical system 110. A specific configuration of the projection optical system 110 is described with reference to FIG. 3.

The projection optical system 110 has a light source 10, a UV-IR cut filter 20, a fly-eye lens unit 30, a PBS array 40, a plurality of liquid crystal panels 50 (a liquid crystal panel 50R, a liquid crystal panel 50G, and a liquid crystal panel 50B), and a cross-dichroic prism 60.

The light source 10 may be a light source that emits a white light, for example, a UHP lamp or a xenon lamp. That is, the white light emitted from the light source 10 contains a red component light R, a green component light G, and a blue component light B.

The UV-IR cut filter 20 transmits visible light components (the red component light R, the green component light G, and the blue component light B). The UV-IR cut filter 20 blocks an infrared light component and an ultraviolet light component.

The fly-eye lens unit 30 uniforms light from the light emitted, from the light source 10. The fly-eye lens unit 30 includes a fly-eye lens 31 and a fly-eye lens 32. Each of the fly-eye lenses 31 and 32 is formed of an array of microlenses. Each of the microlenses collects the light emitted from the light source 10 so that the whole planes of the liquid crystal panels 50R, 50G, and 50B are irradiated with the light emitted from the light source 10.

The PBS array 40 makes polarization of the light that has exited the fly-eye lens unit 30 uniform. For example, the PBS array 40 adjusts polarization of the light exiting from the fly-eye lens unit 30 to be S polarization (or P polarization).

The liquid crystal panel 50R modulates the red component light R based on a red output signal Rout. An incident side polarizing plate 52R is provided on the side, on which the light is incident, of the liquid crystal panel 50R. The incident side polarizing plate 52R transmits light having one polarization direction, (for example, S polarization), and blocks light, having the other polarization direction (for example, P polarization). An exit side polarizing plate 53R is provided on the side, from which the light exits, of the liquid crystal panel 50R. The exit side polarizing plate 53R blocks light having one polarization direction (for example, S polarization), and transmits light having the other polarization direction (for example, P polarization).

The liquid crystal panel 50G modulates the green component light G based on a green output signal Gout. An incident side polarizing plate 52G is provided on the side, on which the light is incident, of the liquid crystal panel 50G. The incident side polarizing plate 52G transmits light having one polarization direction, (for example, S polarization), and blocks light having the other polarization direction, for example, P polarization. On the other hand, an exit side polarizing plate 53G is provided on the side, from which the light exits, of the liquid crystal panel 50G. The exit side polarizing plate 53G blocks light having one polarization direction (for example, S polarization), and transmits light having the other polarization direction (for example, P polarization).

The liquid crystal panel 50B modulates the blue component light B based on a blue output signal Bout. An incident side polarizing plate 52B is provided on the side, on which the light is incident, of the liquid crystal panel 50B. The incident side polarizing plate 52B transmits light having one polarization direction (for example, S polarization), and blocks light having the other polarization direction (for example, P polarization). On the other hand, an exit side, from which the light exits, polarizing plate 53B is provided on the side of the liquid crystal panel 50B. The exit side polarizing plate 53B blocks light having one polarization direction (for example, S polarization), and transmits light having the other polarization direction (for example, P polarization).

It is noted that the red output signal Rout, the green output signal Gout, and the blue output signal Bout form an image output signal. The image output signal is a signal for a plurality of pixels which form one frame.

Here, each of the liquid crystal panels 50R, 50G, and 50B may be provided with a compensator (not shown) that increases a contrast ratio and transmittance. Further, each polarizing plate may be provided with a pre-polarizing plate which reduces the quantity of light incident on the polarizing plate and a thermal burden on the polarizing plate.

The cross-dichroic prism 60 forms a color combining unit which combines the respective lights exiting from the liquid crystal panel 50R, the liquid crystal panel 50G, and the liquid crystal panel 50B, The combined light exiting from the cross-dichroic prism 60 is guided into the projection lens 120.

The projection optical system 110 also has a mirror group including a mirror 71 to a mirror 76 and a lens group including a lens 81 to a lens 85.

The mirror 71 is a dichroic mirror that transmits the blue component light B and reflects the red component light R and the green component light G. The mirror 72 is a dichroic mirror that transmits the red component light R and reflects the green component light G. The mirror 71 and the mirror 72 form a color separation unit which separates the red component light R, the green component light G, and the blue component light B.

The mirror 73 reflects the red component light R, the green component light G, and the blue component light B to guide the red component light R, the green component light G, and the blue component light B to the mirror 71. The mirror 74 reflects the blue component light B to guide the blue component light B to the liquid crystal panel 50B. The mirror 75 and the mirror 76 reflect the red component light R to guide the red component light R to the liquid crystal panel 50R.

The lens 81 is a condensing lens that collects the light exiting from the PBS array 40. The lens 82 is a condensing lens that collects the light reflected from the mirror 73.

The lens 83R collimates the red component light R to irradiate the liquid crystal panel 50R with the red component light R. The lens 83G collimates the green component light G to irradiate the liquid crystal panel 50G with the green component light G. The lens 83B collimates the blue component light B to irradiate the liquid crystal panel 50B with the blue component light B.

A lens 84 and the lens 85 are relay lenses for roughly focusing the red component light R on the liquid crystal panel 50R by suppressing the diffusion of the red component light R.

Returning to FIG. 2, the image input unit 130 receives an image signal from outside. The image input, unit 130 has input ports (not shown) for receiving a plurality of image signals, such as DVI, HDMI (registered trademark), and SDI. The image input unit 130 receives the image signal via a selected input port and outputs the received image signal to the image processer 140.

Figure 4:
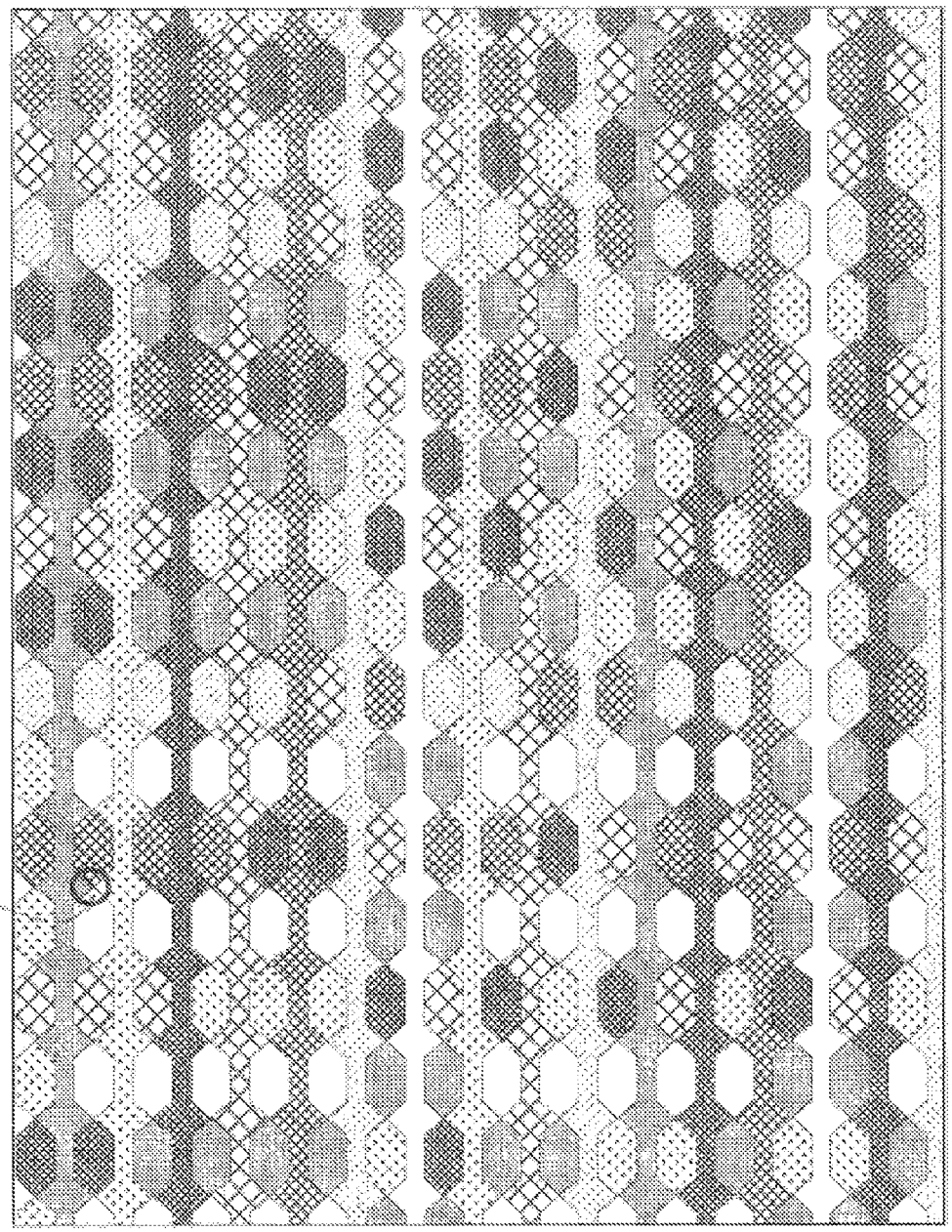
FIG. 4 is a diagram illustrating a color pattern projected from the projector.

The image processer 140 has a pattern generation circuit 141 and a geometric correction circuit 142. The pattern generation circuit 141 stores a color pattern as illustrated in FIG. 4, for example, and outputs the color pattern according to an instruction from the microcomputer 180. A signal output from the pattern generation circuit 141 is input to the geometric correction circuit 142. The color-pattern has color regions which are respectively colored with red, green, blue, cyan, yellow, magenta, white, and black and systematically arranged. The color pattern has a feature point at each point where four color regions meet. In FIG. 4, the pattern of the respective color regions correspond to colors of the respective color regions. As to the color pattern and the generation circuit of the color pattern, the technology disclosed in JP 2012-22246 A, for example, can be used.

The geometric correction circuit 142 receives the image signal input, from, the image input unit 130 or the pattern generation circuit 141, electrically modifies the shape of the image according to correction information, and outputs the image signal that represents the modified image. The display device controller 150 controls driving of the liquid crystal panels 50R, 50G, and 50B based on the image signal input from the image processor 140.

The communication unit 160 has a network interface card and is connected with the adjusting PC 200 to communicate data with the adjusting PC 200. Specifically, the communication unit 160 receives commands such as commands to control the projectors 101-103 or commands to collect information from an external control apparatus, such as the adjusting PC 200. The command is analyzed and executed by the microcomputer 180. The communication unit 160 sends the result of execution of the command to the external control apparatus.

The lens controller 170 performs focus drive control, zoom drive control, and lens shift drive control on the projection lens 120 according to the control instruction from the microcomputer 180. The lens shift refers to an operation of causing the whole projection lens 120 to move in a direction perpendicular to the optical axis. The lens shift shifts display positions on the screen of images projected from the projectors 101-103. Further, the lens controller 170 manages lens information including a lens shift range, a zoom range, the current lens shift position, the current zoom position, coordinates of the optical axis center with respect to the projection lens 120.

The microcomputer 180 executes software, computer program, and/or firmware to control the entire operation of the projectors 101, 102, and 103.

1-1-3. Configurations of the Adjusting PC and the Camera

Figure 5:
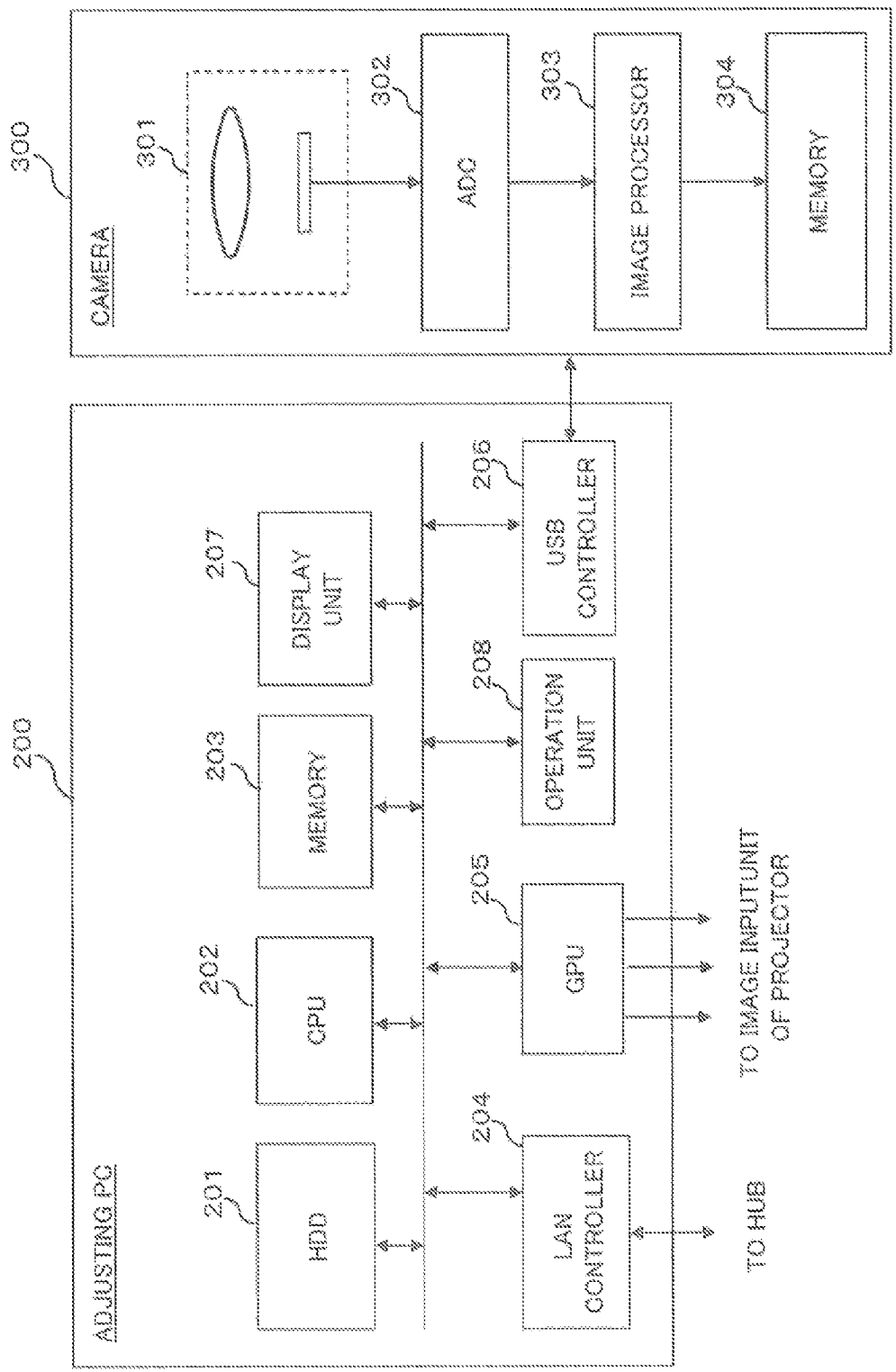
FIG. 5 is a block diagram illustrating configurations of an adjusting personal computer (PC) and a camera.

FIG. 5 is a diagram illustrating internal configurations of the adjusting PC 200 and the camera 300 according to the first embodiment. The adjusting PC 200 has an HDD 201, a CPU 202, a memory 203, a LAN controller 204, a Graphics Processing Unit (GPU) 205, and a USB controller 206.

The CPU 202 controls the entire operation of the adjusting PC 200 including operation described later by executing a program stored in the HDD 201. The program to be executed by the CPU 202 may be provided for the adjusting PC 200 via an optical disc medium, for example, a CD-ROM or a DVD-ROM, or a recording medium that has a semiconductor memory such as a memory card or a USB memory, or through a communication line.

The adjusting PC 200 further has a display unit 207 configured to display information and an operation unit 208 configured to input an instruction from a user. The display unit 207 includes a liquid crystal display or an organic electro-luminescence (EL) display. The operation unit 208 includes a keyboard, a mouse, a touch panel, and/or the like.

The camera 300 has an imaging optical system 301 including a lens and a CCD image sensor, an AD converter (ADC) 302, an image processor 303, and a memory 304.

The imaging optical system 301 captures a subject image formed through the lens with the CCD image sensor to generate image data. The AD converter 302 converts analog image data generated by the imaging optical system 301 to digital data.

The memory 304 temporarily stores the image data output from the AD converter 302. The memory 304 also temporarily stores image data currently being processed and image data completely processed by the image processor 303. In short, the memory 304 is a means for temporarily storing image data to realize image processing with the image processor 303.

The image processor 303 performs various types of image processing on the image data output from the AD converter 302. For example, the image processor 303 performs, on the output image data, a white balance adjustment process, a gamma process, a compression process, a YC conversion process, an electronic zoom process, an expansion process, or the like, or any combinations of those processes on the output image data. Here, the image processor 303 may be configured to perform all of the processes or only some of the processes.

1-2. Operation]

Operation of the projection image display system 1 with the above described configuration is described below.

1-2-1. Automatic Projection Region Adjustment Operation

Figure 6:
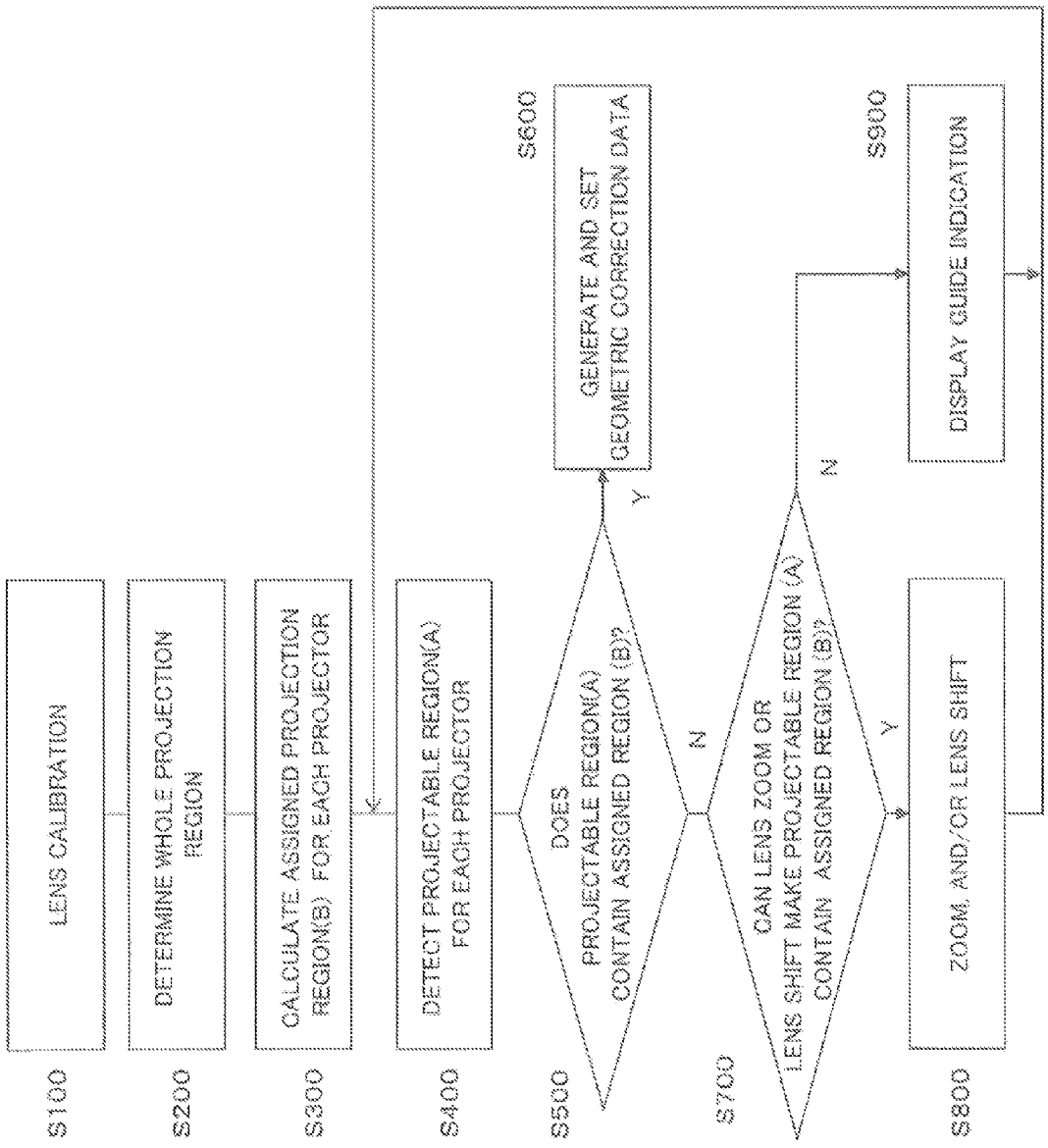
FIG. 6 is a flowchart for describing an operation of fitting a projection image into a screen.

FIG. 6 is a flowchart showing an operation of adjusting a projection image by the adjusting PC 200 to fit the projection image into a region of the screen 400 (This operation is referred to as "automatic projection region adjustment operation" hereinafter.) The automatic projection region adjustment operation is achieved by the CPU 202 of the adjusting PC 200 executing a specific application program.

When the automatic projection region adjustment operation is started, the CPU 202 first performs lens calibration (S100). For that purpose, the adjusting PC 200, i.e., the CPU 202, instructs the projectors 101, 102, and 103 to carry out lens calibration that is a process of obtaining lens information of the projectors 101, 102, and 103, respectively. The lens information includes the current, zoom magnification, lens shift position, the available zoom magnification range, and lens shift, range. Details of the lens calibration process (S100) is described later.

Next, the CPU 202 determines a region of the screen 400 on which an image is projected and an overlapping width that is a width of a region in which the adjacent projectors project images to superimpose one of the images on the other (S200). Details of the process (S200) is described later.

The CPU 202 calculates assigned projection regions (B) which are assigned to the respective projectors 101-103, from the determined region of the screen 400 and overlapping widths (S300). Subsequently, the adjusting PC 200 detects regions (A) in which the respective projectors 101-103 can actually project images (such a region is referred to as "projectable region", hereinafter) (S400). Then, the CPU 202 determines whether the projectable region A contains the assigned projection region B with respect to each of the projectors 101-103 (S500).

In the case where the projectable region A contains the assigned projection region B for all of the projectors 101-103 (YES in S500), the CPU 202 generates geometric correction data to adjust the shape of the projected image to the shape of the assigned projection region B and performs geometric correction on the projection image, for each of the projectors 101-103 (S600). As a result, the adjustment operation of fitting a projection image to the region of the screen 400 is completed.

On the other hand, in the case where there is a projector of which projectable region A, does not contain the assigned projection region B (NO in S500), the CPU 202 corrects the position of the image projected from that projector to cause the projectable region A to contain the assigned projection region B. Specifically, the CPU 202 first determines whether it is possible to make the projectable region A contain the assigned projection region B by controlling the lens of the projector based on the lens information (current zoom magnification, current lens shift position, available zoom magnification range, and lens shift range) obtained in the lens calibration (S100) (S700)

In the case where it is possible to make the projectable region A contain the assigned projection region B by controlling the lens, the CPU 202 instructs the projector to perform adjustment, by sending a target zoom magnification, or a target lens shift position, or both of then (S800). Specifically, the CPU 202 changes the zoom magnification of the projector, or lens shift position of the projector, or both of them so as to move the projection image of the projector from the current position to a position that makes the projectable region A for the projector contain the assigned projection region B of the projector.

On the other hand, in the case where it is not possible to make the projectable region A contain the assigned projection region B by controlling the lens, the user has to move the projectable region A by changing the arranged physical position of the projector, for example, the installed position, the installed angle, or the like, or any combinations of them of the projector. For that purpose, the CPU 202 sends a command for causing the projectors 101-103 to project a reference figure or a guide figure for showing the user a target position to which the projectable region A, i.e., the projector 101-103 is moved. Specifically, the CPU 202 sends a command specifying the shape, the color, and the position of the reference figure or the guide figure, i.e., a reference cursor or a guide cursor, to the projectors 101-103. According to the received command, the projectors 101-103 display the reference graphic or the guide figure. The reference graphic or the guide figure (a reference cursor or a guide cursor) is described later.

After the projectable region A is changed by the projector in the automatic manner or by the user in a manual manner, the CPU 202 returns to control of step S400. Thereafter, the processes from steps S400-S900 are repeated until the projectable region A contains the assigned projection region B for each of the projectors 101-103.

Detailed operation in each of the above described step of the flowchart is discussed below.

(A) Lens Calibration (S100)

Figure 7:
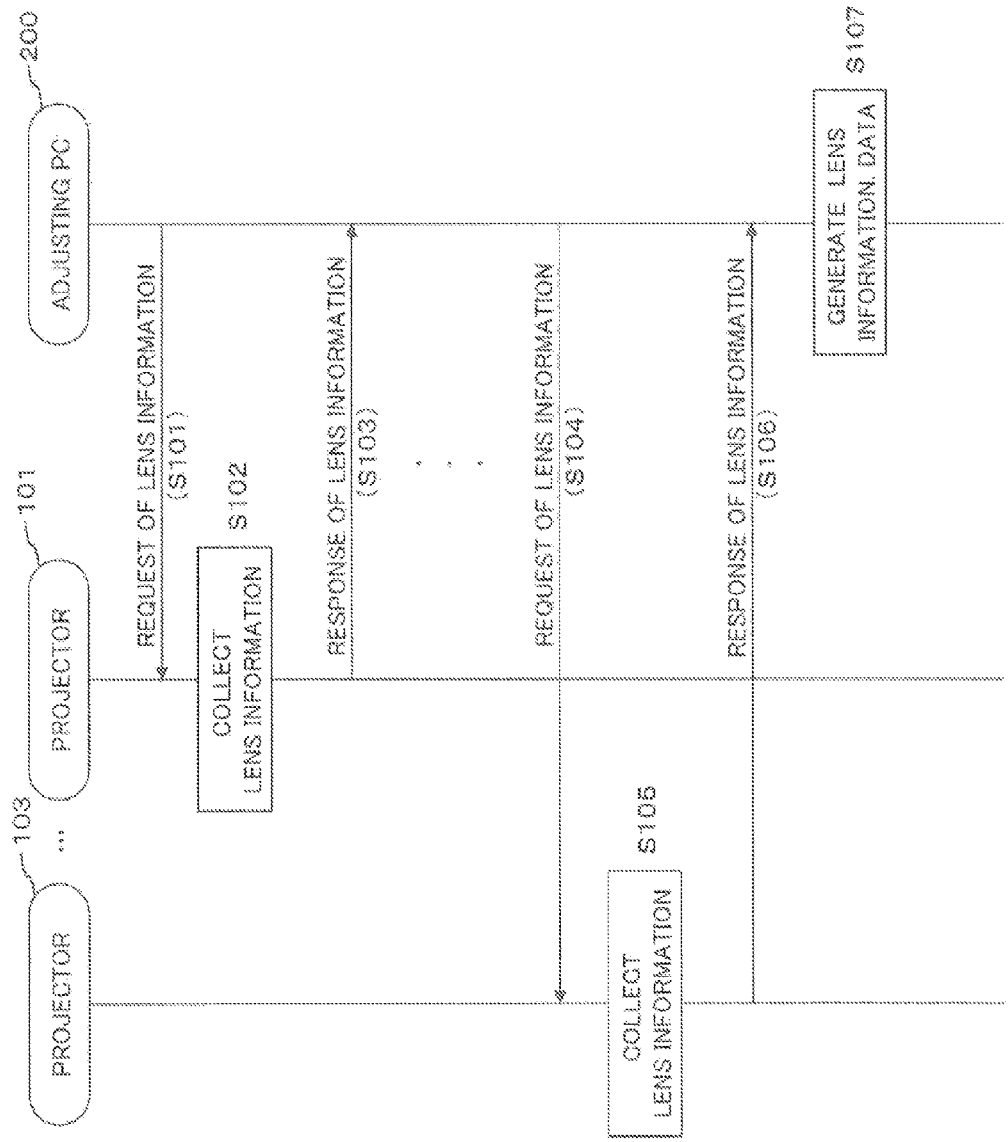
FIG. 7 is a timing chart for describing an operation of generating lens information for the respective projectors.

FIG. 7 is a timing chart of the lens calibration process of obtaining the lens information from the respective projectors 101, 102, and 103 (step S100 of FIG. 6).

The adjusting PC 200 sends a lens information request command to the first projector 101 (S101). The lens controller 170 of the projector 101 collects the lens information including the lens shift range, the zoom range, the current lens shift position, the current zoom position, the coordinates of the optical axis center of the projection lens 120 (S102) and sends the lens information to the adjusting PC 200 (S103).

The adjusting PC 200 performs the same process as the above process on all of the other connected projectors 102-103 (S104-S106) to obtain the lens information. The adjusting PC 200 generates lens information data based on the obtained lens information (S107).

FIG. 8 shows an example of the lens information data generated on the basis of the obtained lens information. In the lens information data shown in FIG. 8, the lens provided on a projector of Projector Number 1 (the projector 101) has the shift ranges between horizontally plus or minus 500 dots and vertically plus or minus 300 dots and the current, shift position (100, 50), for example. It is also shown that the zoom magnification is increased by up to a maximum of 2.2 and the current zoom value is 1.45-power and the coordinates of the optical axis when the image is zoomed is (960, 720). In this case, even if the zoom magnification is changed, the pixel position of the coordinates (960, 720) does not change in the projection space and the image is zoomed around the position (960, 720).

(B) Determination of Projection Region (S200)

Figure 9:
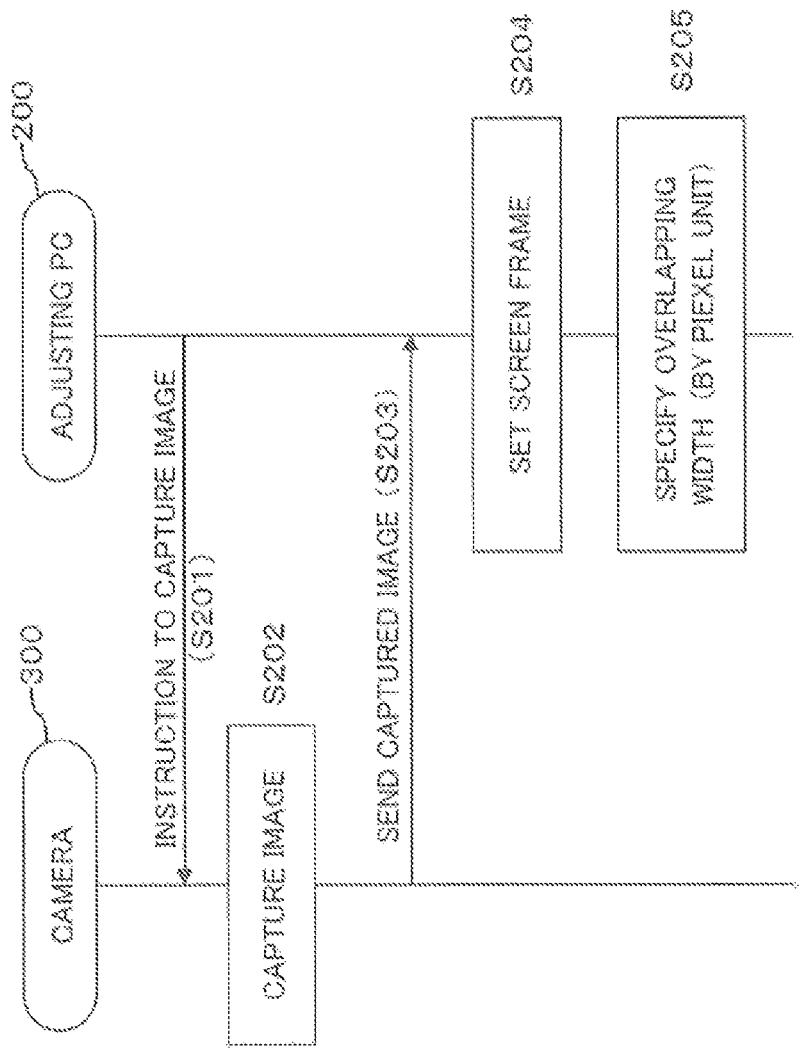
FIG. 9 is a timing chart for describing an operation of deciding an assigned, projection region.

FIG. 9 is a timing chart of the projection region determination process (step S200 of FIG. 6) of specifying the screen region and the overlapping width.

The adjusting PC 200 (the CPU 202) sends an image capture instruction command to the camera 300 of which position is previously adjusted so that the camera 300 can capture an image containing the screen 400 (S201). In response to the image capture instruction, the camera 300 captures an image (S202) and sends the captured image to the adjusting PC 200 (S203).

Figure 10:
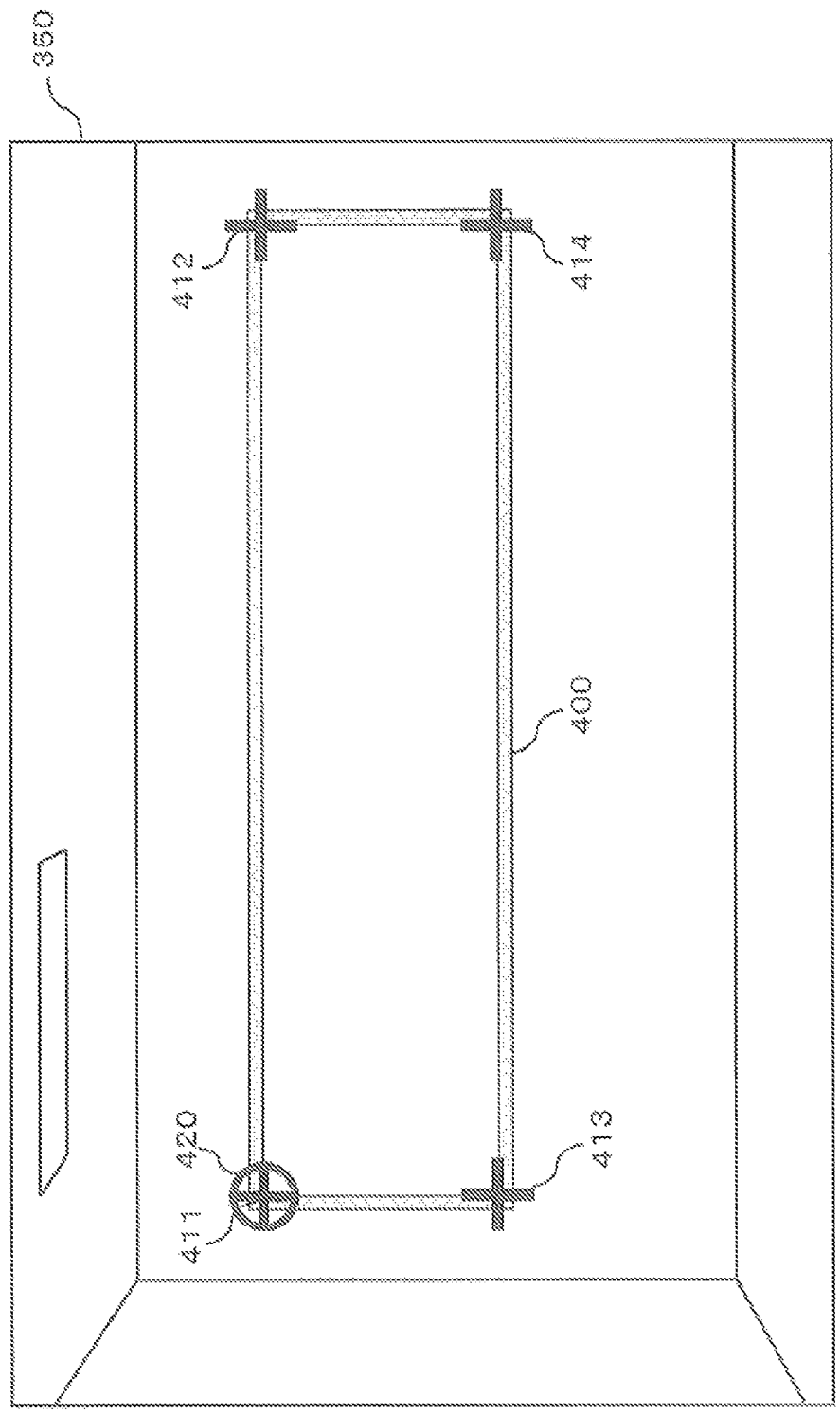
FIG. 10 is a schematic diagram illustrating a user interface that is displayed when defining a screen frame.

The CPU 202 displays the captured image obtained from the camera 300 on the display unit 207 so that the user specifies the position of the screen 400 on the image. The CPU 202 displays an image as illustrated in FIG. 10 as an image for specifying the position of the screen 400 on the display unit 207. As illustrated in FIG. 10, four crosshair cursors (+) 411-414 are displayed on a captured image 350 obtained from the camera 300. The user specifies the screen region (the position of the screen frame) by dragging the cursors 411-414 to four corners of the screen 400 by using a mouse and the like. Meanwhile, the cursor 411 on the upper left corner of the screen 400 is marked with a circle 420 which indicates that the cursor 411 is to be operated (a target of the user operation).

The region (the position) of the screen 400 may be automatically detected by image analysis instead of being specified by the user.

Then, the CPU 202 inputs the overlapping width specified by the user (S205), the overlapping width being a width of a region at which parts of images projected by the adjacent projectors are overlapped. The overlapping width is preferably set to about 10% of the breadth of the assigned projection region. However the overlapping width is not limited to this but may be set to any width by the user.

(C) Calculation of Assigned Projection Region of Projector (S300)

The calculation process of the assigned projection region (B) assigned to the projector (step S300 of FIG. 6) is described below.

Figure 11:
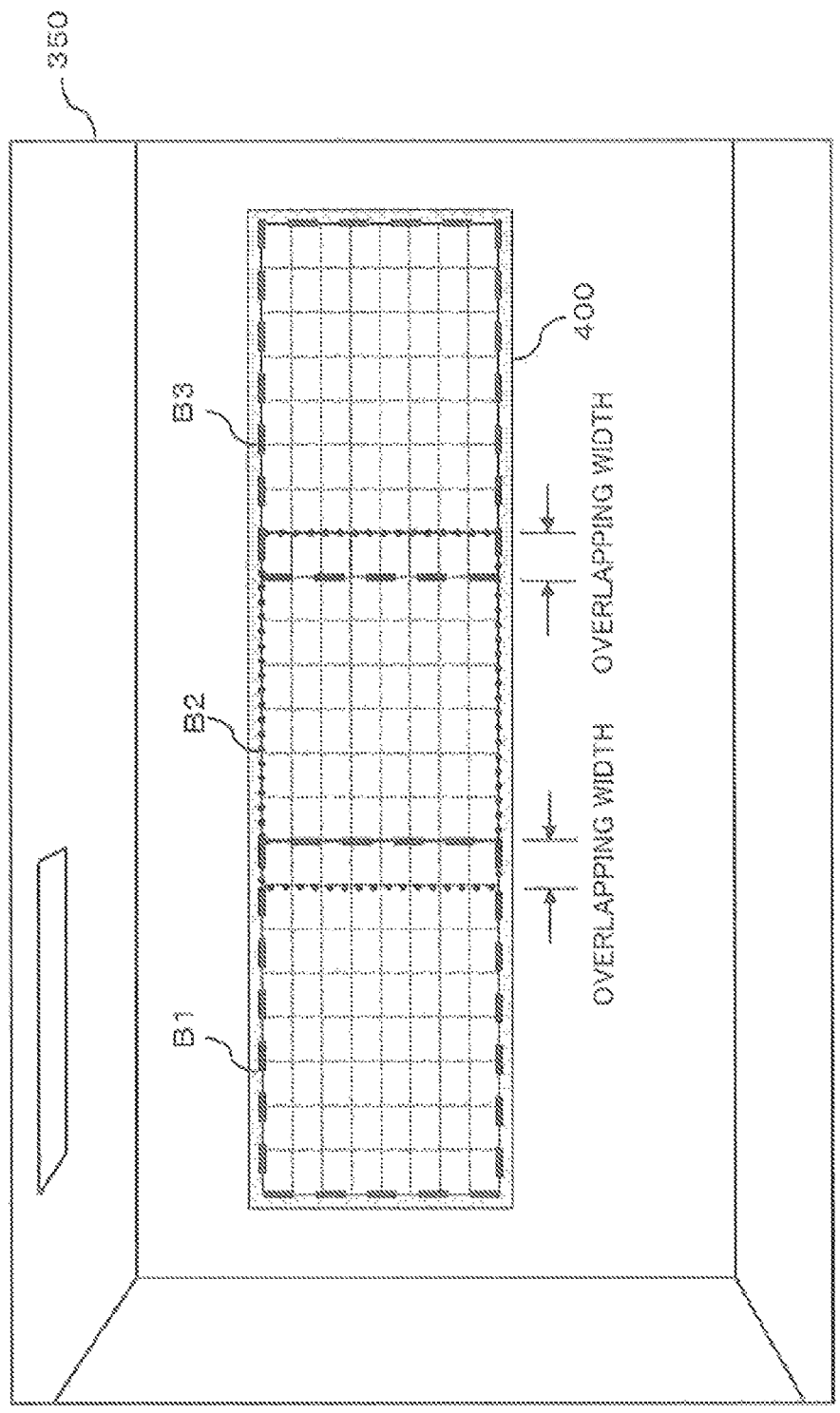
FIG. 11 is a schematic diagram for describing a relationship among assigned projection regions of the respective projectors.

FIG. 11 is a diagram illustrating the assigned projection regions B1, B2, and B3 of the respective projectors 101, 102, and 103 in the captured image 350. The CPU 202 calculates the regions B1, B2, and B3 by equally dividing the screen region by the number of projectors 101, 102, and 103 based on the screen region specified by the user on the captured image 350 shown on the image displayed on the display unit 207 of the adjusting PC 200 and the overlapping width input by the user, and sets the regions B1, B2, and B3 to the assigned projection regions B1, B2, and B3 of the respective projectors 101, 102, and 103. Then, the CPU 202 superimposes the assigned projection regions B1, B2, and B3 which are set in the above described manner on the screen 400 in the captured image 350 as illustrated in FIG. 11. In FIG. 11, perimeters of the respective assigned projection regions B1, B2, and B3 are shown by dashed lines.

(D) Detection of Projectable Region of Projector (S400)

The calculation process of the projectable regions (A) for the respective projectors (step S400 of FIG. 6) is described below.

Figure 12:
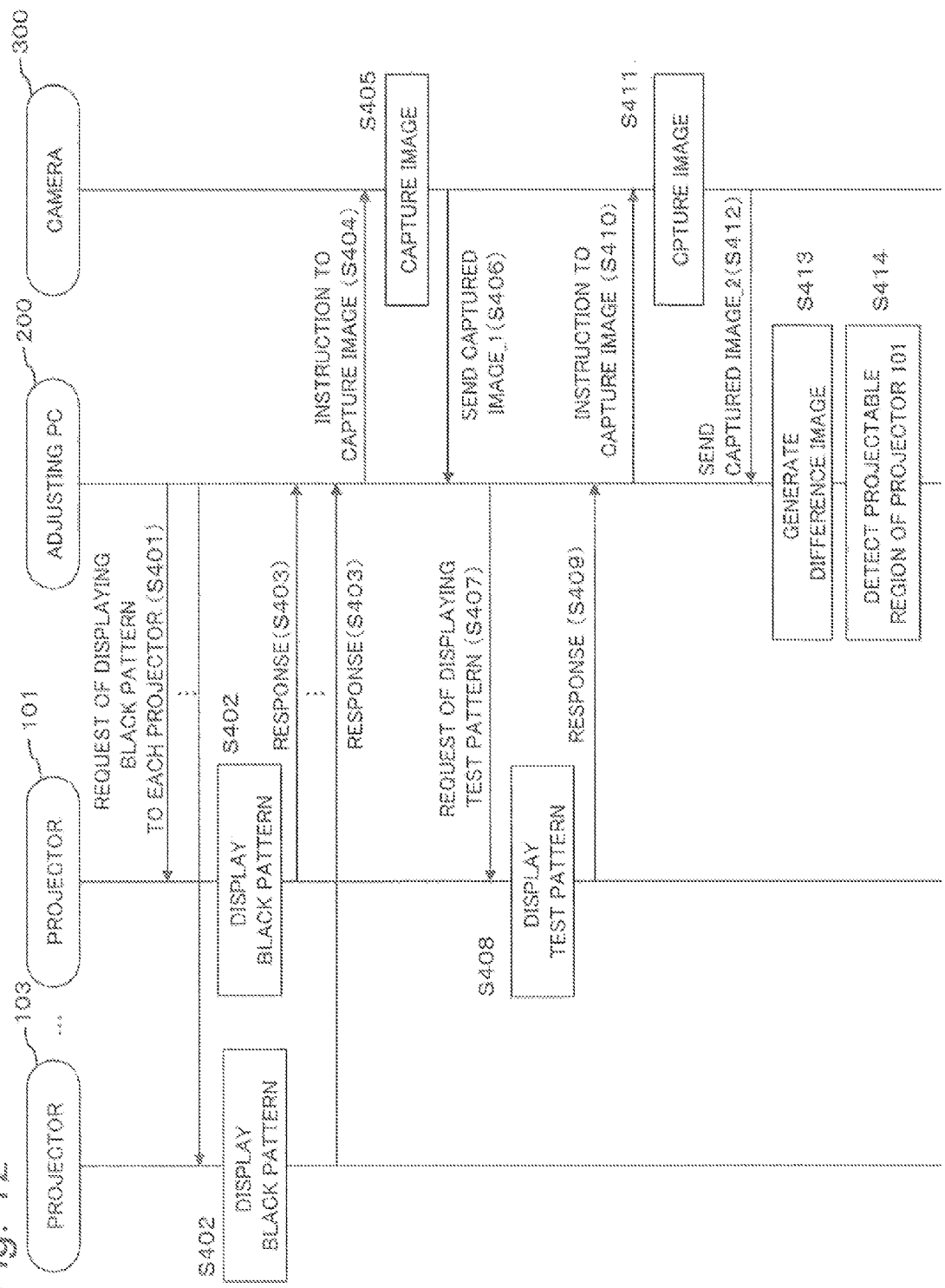
FIG. 12 is a timing chart for describing an operation of calculating a projectable region for each of the projectors.

FIG. 12 is a timing chart of the calculation process (step S400 of FIG. 6) of the projectable regions (A) for the respective projectors. The adjusting PC 200 (the CPU 202) sends a request for displaying black pattern to all of the projectors 101, 102, and 103 (S401). In response to the request, the respective projectors 101, 102, and 103 display black patterns (S402) and sends responses to the adjusting PC 200 (S403).

By receiving the responses, the CPU 202 confirms that all of the projectors 101, 102, and 103 has displayed black patterns. Then, the CPU 202 sends an instruction to capture an image to the camera 300 (S404). The camera 300 captures an image of an area containing the screen 400 according to the instruction (S405) and sends a captured image_1 to the adjusting PC 200 (S406). The captured image_1 is an image of an object with brightness illuminated by light from lighting fixtures in the room or natural light without projection light from the respective projectors 101-103.

Next, the CPU 202 sends a request to display test pattern to the first projector 101 (S407). In response to the request, the projector 101 projects a color pattern as illustrated in FIG. 4 as the test pattern (S408) and sends a response to the adjusting PC 200 (S409).

In response to the response from the projector 101, the adjusting PC 200 (the CPU 202) sends an instruction to capture an image to the camera 300 (S410). According to the instruction, the camera 300 captures an image of an area containing the screen 400 on which the test pattern is projected (S411) and sends a captured image_2 to the adjusting PC 200 (S412).

The adjusting PC 200 (the CPU 202) generates a difference image from the received captured image_1 and captured image_2 (S413). Based on the difference image, an image, from which noise components (such as illuminating light in the room or natural light) other than the projection light from the projector are removed, can be obtained. The CPU 202 detects positions of the feature points in the test pattern projected from the projector 101 based on the difference image and detects a projectable region M for the projector 101 based on information about the detected positions (S414).

Thereafter, the CPU 202 detects projectable regions A2 and A3 for the other projectors 102 and 103 in the same manner.

(E) Geometric Correction Data Generating and Setting Process (S600)

Figure 13:
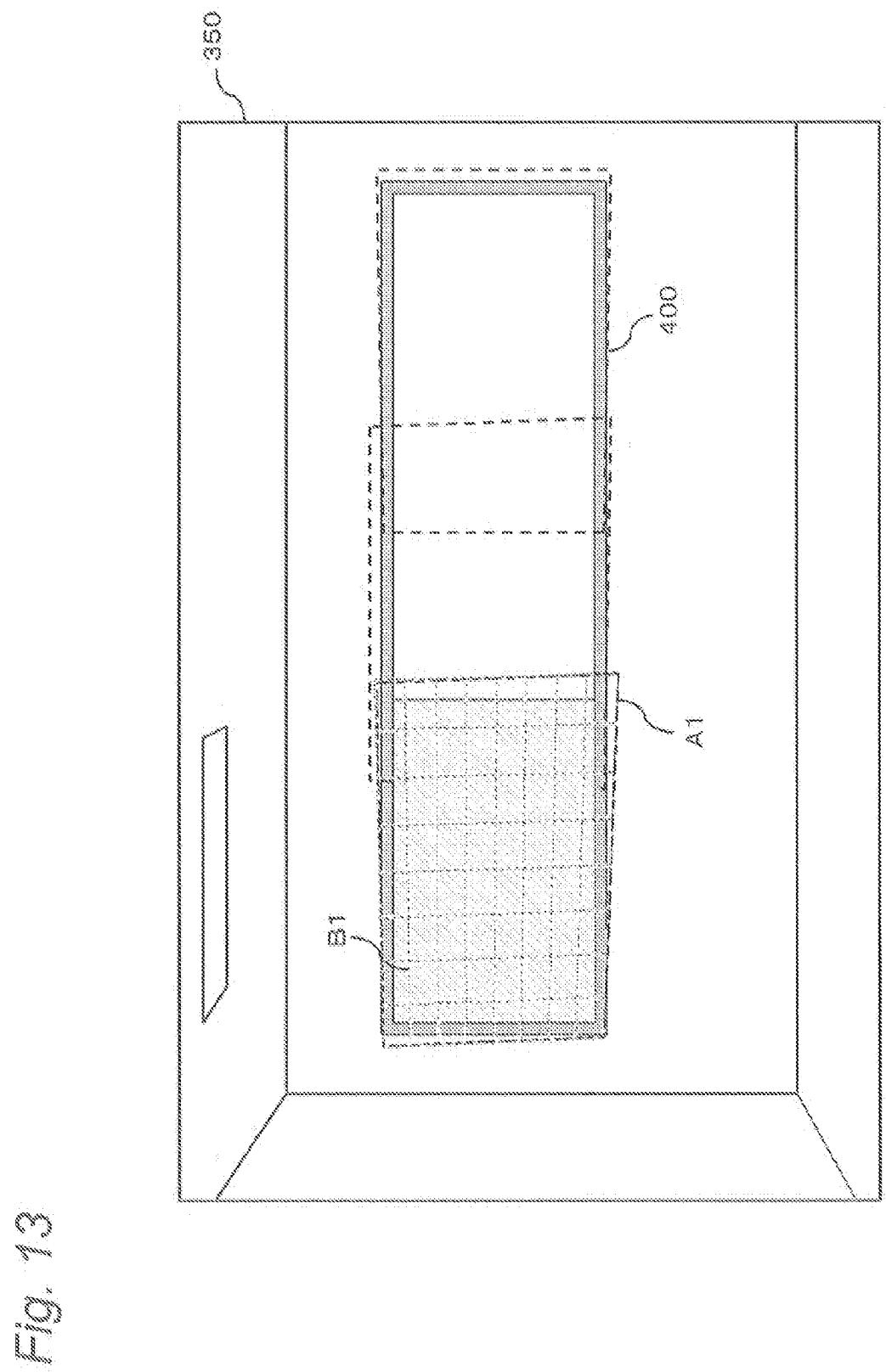
FIG. 13 is a schematic diagram illustrating a relationship between the assigned projection region and the projectable region of a projector at OK position.

The determination, in step S500 of the flowchart shown in FIG. 6, that the projectable regions A for the projectors 101-103 contain the assigned projection regions B means that the respective projectors are arranged in proper positions (this is referred to as "OK position", hereinafter). In that case, the CPU 202 generates the geometric correction data to adjust the shape of the projection image to the assigned projection region B for each of projectors (S600). The generation of the geometric correction data is specifically described below. It is assumed, as an example, that the projectable region A1 for the projector 101 contains the assigned projection region B1 for the projector 101, as illustrated in FIG. 13.

Figure 14B:
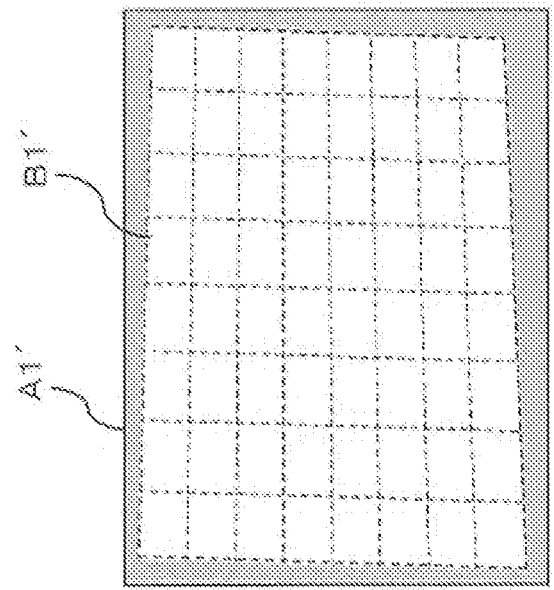
FIGS. 14A and 14B are schematic diagrams for describing an operation of generating geometric correction data.
Figure 14A:
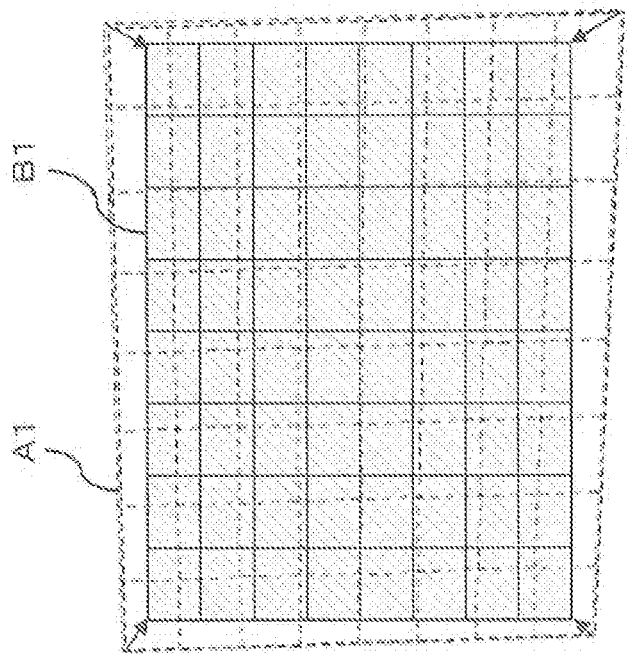

FIG. 14A is a diagram illustrating a relationship between the projectable region A1 and the assigned projection region B1 in an image captured by the camera 300 (in a camera coordinate system). The respective feature points in the projectable region A1 are associated with the respective coordinates (a projector coordinate system) on the liquid crystal panels 50 of the projectors 101-103. From the above described relationship, a transformation between the camera coordinates and the projector coordinates can be obtained. It is well known that when four coordinates of a source of transformation and corresponding four coordinates of a destination of transformation are given, the Homography transformation matrix H for realizing plane transformation between the four coordinates of the source of transformation and the corresponding four coordinates of the destination of transformation is obtained. By using the Homography transformation matrix H, the camera coordinates in the assigned projection region B1 are transformed into coordinates in the projector coordinate system. Hence, as illustrated in FIG. 14B, the geometric correction data for the assigned projection region B1 can be obtained in a display region A1' on the liquid crystal panel of the projector.

(F) Lens Zoom Process and Lens Shift Process (S800)

The determination, in step S500 of the flowchart shown in FIG. 6, that not all of the projectable regions A for the projectors 101-103 contain the assigned projection regions B means that not all of the respective projectors are arranged in proper positions (this is referred to as "NG position" hereinafter. Then, in the case where there is a possibility to make the projectable region A contain the assigned projection region B by controlling the lens (by performing a zoom process, or a lens shift process, or both of them) for the projector of NG position (YES in S700), the CPU 202 performs the lens control (the zoom process and/or the lens shift process) to shift the projection region (S800).

Figure 15:
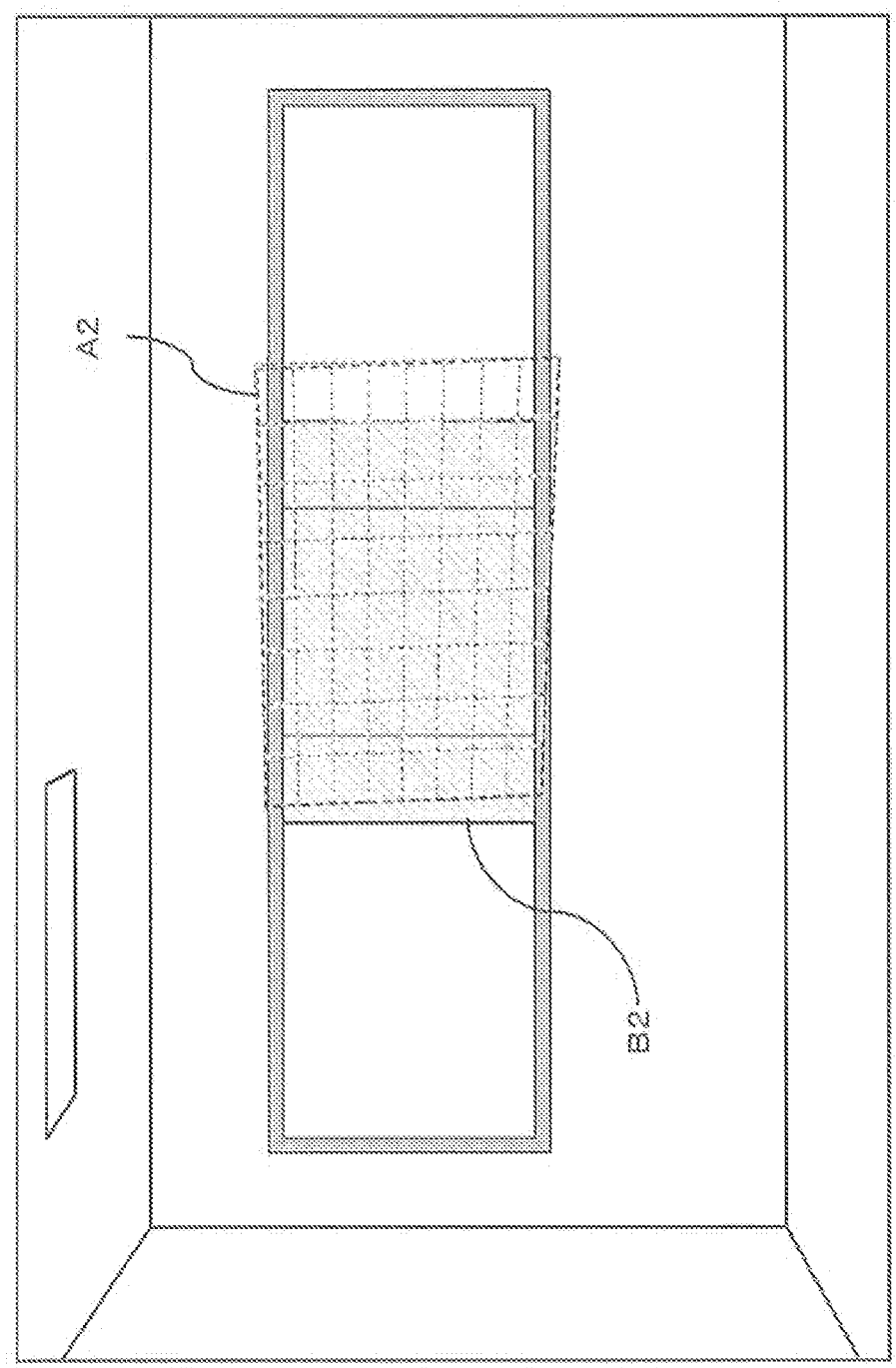
FIG. 15 is a schematic diagram illustrating a relationship of between the assigned projection region and the projectable region of a projector at NG position.

The processes in step S800 is specifically described below. It is assumed, as an example, that for the projector 102 arranged at the middle position, the projectable region A2 does not contain the assigned projection region B2, as illustrated in FIG. 15. In that case, the CPU 202 first calculates the amount of deviation between the position of the projectable region A2 and the position of the assigned projection region B2. The calculation of the amount of deviation is described below with reference to FIGS. 16A and 16B.

In the calculation of the amount of deviation, the CPU 202 calculates an assigned projection region B2' in the projector coordinate system as in the calculation in step S13. Then, the CPU 202 compares the region of B2' and a display region A2' on the liquid crystal panel of the projector and takes, as the amount of deviation Δ1, the maximum value of the deviation in a part outside the range of the display region A2'.

The CPU 202 calculates the amounts of shift (in the horizontal direction and the vertical direction) or the zoom, value (magnification) for the lens of the projector 102 based on the amount of deviation Δ1, so that the projectable region A2 contains the assigned projection region B2. Then, the CPU 202 sends a command for controlling the lens to move by the obtained amount, of shift or zoom value to the projector 102. The projector 102 performs the zoom magnification change, and/or the lens shift with the lens controller 170 according to the received command, thus automatically adjusting the region of the projected image so as to cause the projectable region A2 to contain the assigned projection region B2.

(G) Guide Display (S900)

In the case where there is no possibility to cause the projectable region A to contain the assigned projection region B by controlling the lens for the projector of NG position (NO in S700), the CPU 202 causes the projector to display a guide (S900). FIGS. 17A to 17C and FIGS. 18A to 180 illustrate examples of guide display.

In the projection image display system 1 according to the first embodiment, the adjusting PC 200 (the CPU 202) controls the projector of OK position adjacent to the projector of NG position to display, as a guide display, the reference figure that is to be referenced by the user for correcting the position of the projector of NG position. Further, the adjusting PC 200 (the CPU 202) controls the projector of NG position to display the guide figure that is to be referenced by the user for correcting the position of the projector of NG position. The reference figure is a figure which is referenced in combination with the guide figure by the user as a reference for alignment.

First, the adjusting PC 200 causes the projector of OK position adjacent to the projector of NG position to display the reference figure. FIGS. 17A to 17C are diagrams illustrating the reference figure displayed by the projector of OK position adjacent to the projector of NG position.

As illustrated in FIG. 17A, the reference figure includes a frame F1 indicating the assigned projection region of the projector of OK position, a straight line L indicating the overlapping width (that is, the boundary of the overlapping region) for the edge blending, and the mark M1 of "+" referenced as a norm (target) for alignment of the projector of NG position (this mark is referred to as "reference cursor", hereinafter). These reference figures are formed on the liquid crystal panels 50 and displayed on the screen 400. The reference cursor M1 is displayed inside the overlapping region (an edge blending region).

FIG. 17A illustrates an example of three projectors 101-103 arrayed in a horizontal direction with the left end and right end projectors 101 and 103 being OK position and the middle projector 102 being NG position. FIGS. 17A to 17C illustrate an example of displays on the liquid crystal panels and an example of projection image with respect to the left end and right end projectors 101 and 103 being OK position, in that case, an image of the reference figure based on the geometric correction data is formed on the liquid crystal panels 50 of the projectors 101 and 103 of OK position located at the left and right of the middle projector 102 of NG position, as illustrated in FIG. 17A. As a result, the reference figure has undergone the geometric correction as illustrated, in FIG. 17B and a projection image as illustrated in FIG. 17C is projected and displayed on the screen 400. That is, the reference figure is projected at the position on the screen 400 corresponding to the assigned projection region B1 and the assigned projection region B3 in the captured image.

Figure 18A:
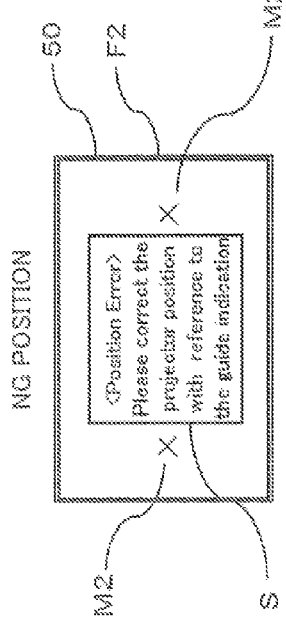
FIGS. 18A to 18C are schematic diagrams for describing an operation of generating a guide figure for correcting a position of the projector.
Figure 18B:
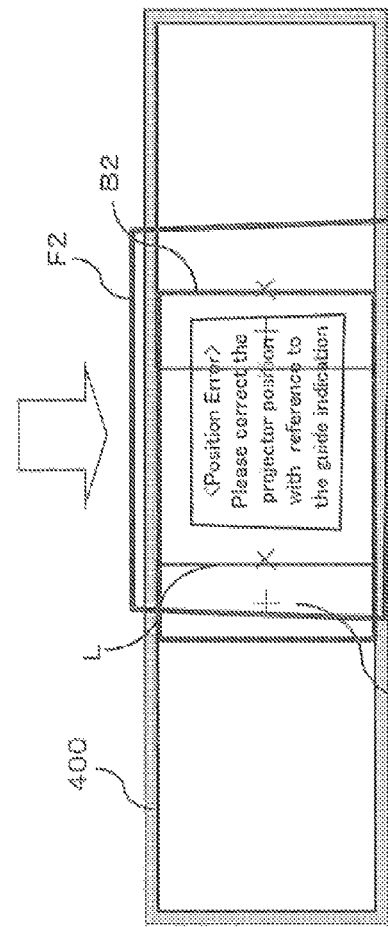
Figure 18C:
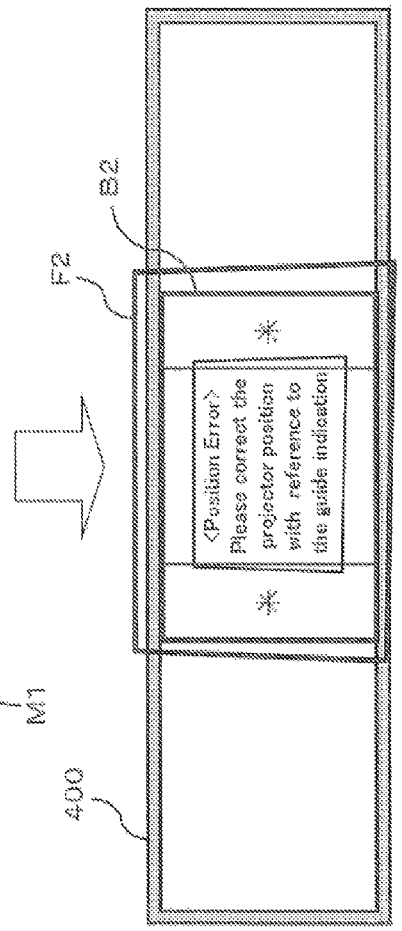

Next, the adjusting PC 200 causes the projector of NG position to display the guide figure. FIGS. 18A to 18C are diagrams illustrating examples of the guide figure displayed by the projector. As illustrated in FIG. 18A, the guide figure includes a frame F2 indicating the projectable region for the projector 102 of NG position, a message S indicating that the projector 102 is NG position and prompting the user to correct (adjust) the position of the projector 102, and a marks M2 of "X" to meet the reference cursor projected by the projectors of OK position 101 and 103 (this mark is referred to as "guide cursor", hereinafter). The guide figure may be displayed in a color different from the reference figure. For example, the guide figure (or the guide cursor) may be displayed in red and the reference figure (or the reference cursor) may be displayed in green.

FIGS. 18A to 18C show a message "<Position Error> Please correct the projector position with reference to the guide indication." is displayed, as the message S, and the message is not limited to that.

Since the reference cursor M1 and the guide cursor M2 are marks to be aligned with each other between the adjacent projectors, the reference cursor M1 and the guide cursor M2 are displayed inside the overlapping region (the edge blending region). In FIGS. 17A to 17C, the reference cursor M1 is displayed in the center of the overlapping region, as an example.

Figure 16B:
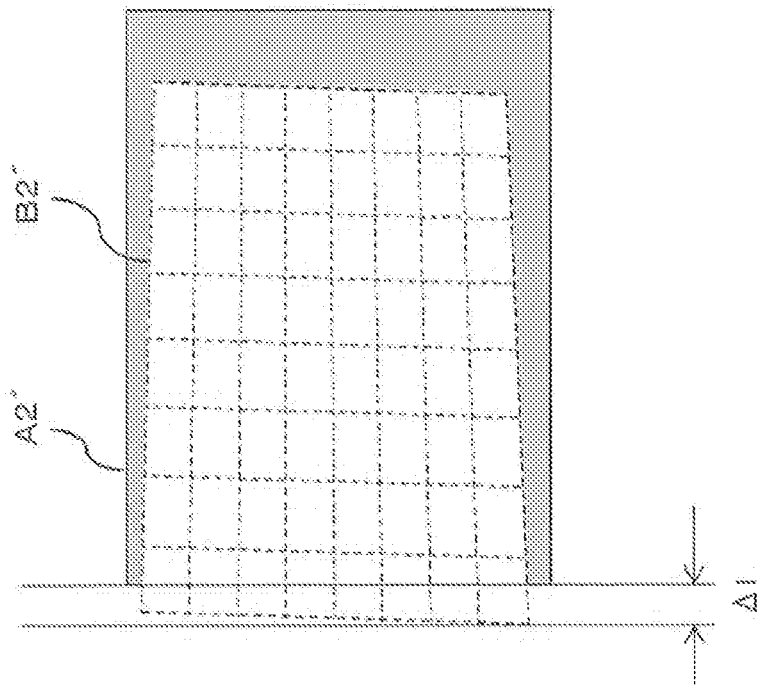
FIGS. 16A and 16B are schematic diagrams for describing an operation of calculating the amount of deviation between the projectable region and the assigned projection region.
Figure 16A:
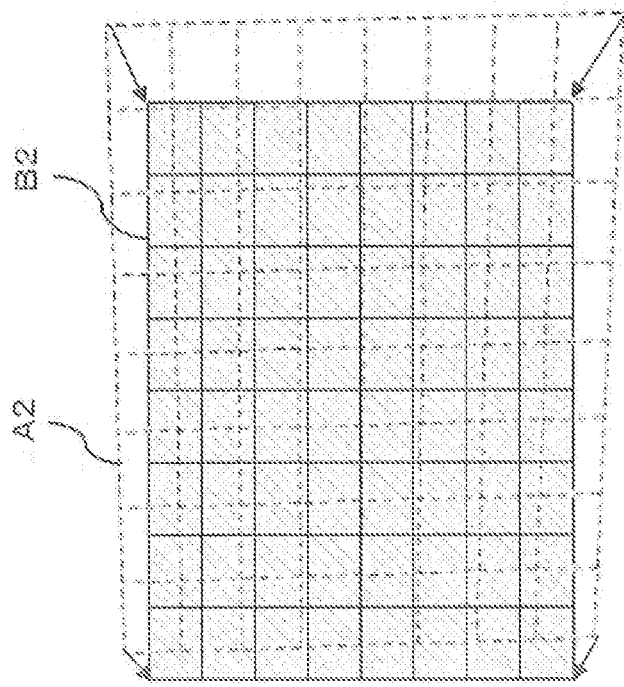

Meanwhile, the position of the guide cursor M2 can be calculated in the following manner, for example. First, the center position of the overlapping region in the current state of the projector 102 of NG position is obtained in the projector coordinate system. This can be calculated by using the Homography transformation matrix H which is described with reference to FIGS. 14A and 14B and FIGS. 16A and 16B. Next, the amount of deviation Δ1 of the projector calculated with reference to FIGS. 16A and 16B is added to the calculated center position, thus to obtain the position of the guide cursor M2.

As a result, the guide figure having the guide cursor M2 displayed at a predetermined position is projected on the screen 400 from the projector 102 of NG position, as illustrated in FIG. 18B.

The user moves, according to the message in the guide figure, the position of the projector 102 of NG position so that the guide cursor M2 is located on the reference cursor M1 to perform the position adjustment, (alignment) of the projector 102.

Meanwhile, the straight line L, which is displayed by the projectors 101 and 103 of OK position, indicating the overlapping width for the edge blending would coincide with the side line of the assigned projection region B of the projector 102 of NG position. Thus, the user may correct the position of the projector 102 of NG position so that the straight line L and the side line of the assigned projection region B of the projector 102 are displayed inside the projectable region A. In this case, the projection position of the projector of NG position is automatically adjusted, by the lens control shown in step S800 of FIG. 6 so that the assigned projection region B is contained in the projectable region A.

By user's moving the position of the projector 102 of NG position so that the guide cursor M2 is superimposed on the reference cursor M1, the guide figure F2 for the middle projector 102 is projected to contain the assigned projection region B2 on the screen 400, as illustrated in FIG. 18C. Then, the adjusting PC 200 can generate the geometric correction data for the projection image of the middle projector 102 and fit the projection image into the assigned projection region B2.

The reference figure may include at least the straight line L indicating the overlapping width (the boundary of the overlapping region) and the guide figure may include at least the frame F2 indicating the projectable region for the projector of NG position. In this case, the user is only required to move the projector of NG position so that the straight line L is contained in the frame F2. By such moving the projector of NG position, the projection position of the projector of NG position is automatically adjusted, by means of the lens control shown in step S800 of FIG. 6, so that the assigned projection region B is contained in the projectable region A.

Alternatively, the reference figure may include at least the reference cursor M1 and the guide figure may include at least the guide cursor M2. In this case, by moving the projector of NG position to superimpose the guide cursor M2 on the reference cursor M1, the user can adjust the projection position of the projector of NG position so that the assigned projection region B is contained in the projectable region A.

1-3. Effects and the Like

As described above, the projection image display system 1 according to the first embodiment includes the plurality of projectors 101, 102, and 103, the adjusting PC 200, and the camera 300. The camera 300 captures an image of the region of the screen 400 and the pattern image projected by the projectors 101-103. Then, the adjusting PC 200 obtains the projectable regions A and the assigned projection regions B of the projectors 101-103 from the captured image, and determines whether the projectable regions A contain the assigned projection regions B, respectively. Then, in the case where any of the projectable regions A cannot contain the corresponding assigned projection region B, the adjusting PC 200 displays the guide figure for prompting the user to correct the position of the corresponding projector.

With the above arrangement, the projector that the projectable region A does not contain the assigned projection region B is controlled to display the guide figure for prompting the user to correct the position of the projector. By referring to the guide figure, the user can easily identify the projector that, needs the position adjustment.

Further, the projector that the projectable region A contains the assigned projection region B, that is, that does not need the position correction is controlled to display the reference figure to be used as a reference for the position adjustment or the position correction of the projector.

In the above manner, the guide figure and the reference figure to be aligned with the guide figure are displayed simultaneously on the screen, and therefore the user can easily recognize a position to which the projector is to be moved and burden of a user in work of position adjustment can be reduced.

Other Embodiments

As described above, the first embodiment has been described as an example of the art disclosed in the present application. However, the art in the present disclosure is not limited to the first embodiment and may also be applied to embodiments which have been subjected to modification, substitution, addition, or omission as appropriate.

The first embodiment describes a case in which three projectors are used. However the number of projectors is not limited to three. The concept of the present disclosure can be applied also to cases in which a plurality of projectors, i.e., two or more projectors, are used.

The first embodiment describes the system in which the projectors 101-103, the adjusting PC 200, and the camera 300 as individual elements are connected through communication cables such as a LAN cable and a USB cable. The functions of these elements may be integrated into a certain component as appropriate. For example, a camera built in the adjusting PC 200 may be used as the camera 300. In this case, it is not required to prepare a camera as an individual element, which accordingly reduces burden in connecting the elements. It is noted that when the camera is provided in the system separately from the adjusting PC 200 and the projectors 101-103, flexibility of installation of the camera becomes larger and a high-resolution sensor which is difficult to be equipped with for the built-in camera can be used, thereby achieving accurate geometric correction. Alternatively, the above described position adjustment function of the adjusting PC 200 may be implemented on the microcomputer 180 included in each of the projectors 101-103. In this case, any one of the projectors 101-103 is required to perform the above described function of the adjusting PC 200. Hence, it does not need to prepare the adjusting PC 200.

The first embodiment describes a configuration in which the projectors 101-103 and the adjusting PC 200 are connected to each other via LAN cables, the projectors 101-103 perform, projection of a color pattern and generation of the guide figure, and the adjusting PC 200 sends the control command for the projectors 101-103. However, the projectors 101-103 and the adjusting PC 200 may be connected by image cables, the adjusting PC 200 may perform generation of a color pattern and generation of the guide figure to send the images via the image cables. With this configuration, the projectors 101-103 do not need to implement the above described specific function. Therefore, it is possible to construct the aforementioned system by using existing projectors. On the other hand, with the configuration of sending the control command via the LAN cables, the number of projectors connected with the adjusting PC 200 is not limited. Therefore, the system has an advantage of being able to project an image on a big screen by using a larger number of projectors.

In the first embodiment, both, of the reference cursor M1 and the guide cursor M2 are displayed in the overlapping region as illustrated in FIGS. 17A to 17C and FIGS. 18A to 18C. However, either one of the reference cursor M1 and guide cursor M2 may be displayed outside the overlapping region, as illustrated in FIGS. 19A and 19B. With that configuration, the user can recognize the direction to move the projector of NG position so that the projectable region A contains the assigned projection region B, by referencing the reference cursor M1 and the guide cursor M2.

Figure 20A:
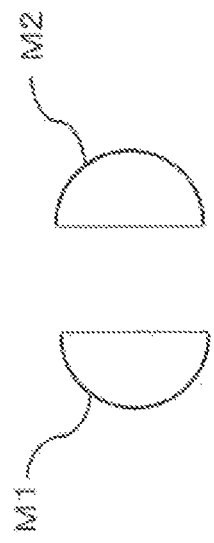
FIGS. 20A to 20C are schematic diagrams for describing another example of guide cursors and reference cursors.
Figure 20B:
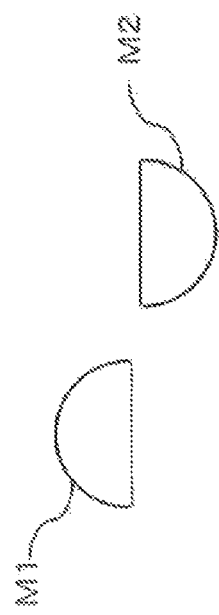
Figure 20C:

In the first embodiment, examples of the reference figure and the guide figure are shown in FIGS. 17A to 17C and FIGS. 18A to 18C, the reference figure and the guide figure are not limited to them. For example, the reference cursor M1 and the guide cursor M2 may be two figures which are combined with each other to form one figure, as illustrated in FIGS. 20A to 20C. That is to say, any figures may be used as long as the user referring to the reference cursor M1 and the guide cursor M2 can recognize the direction to move the projector of NG position.

Figure 21:
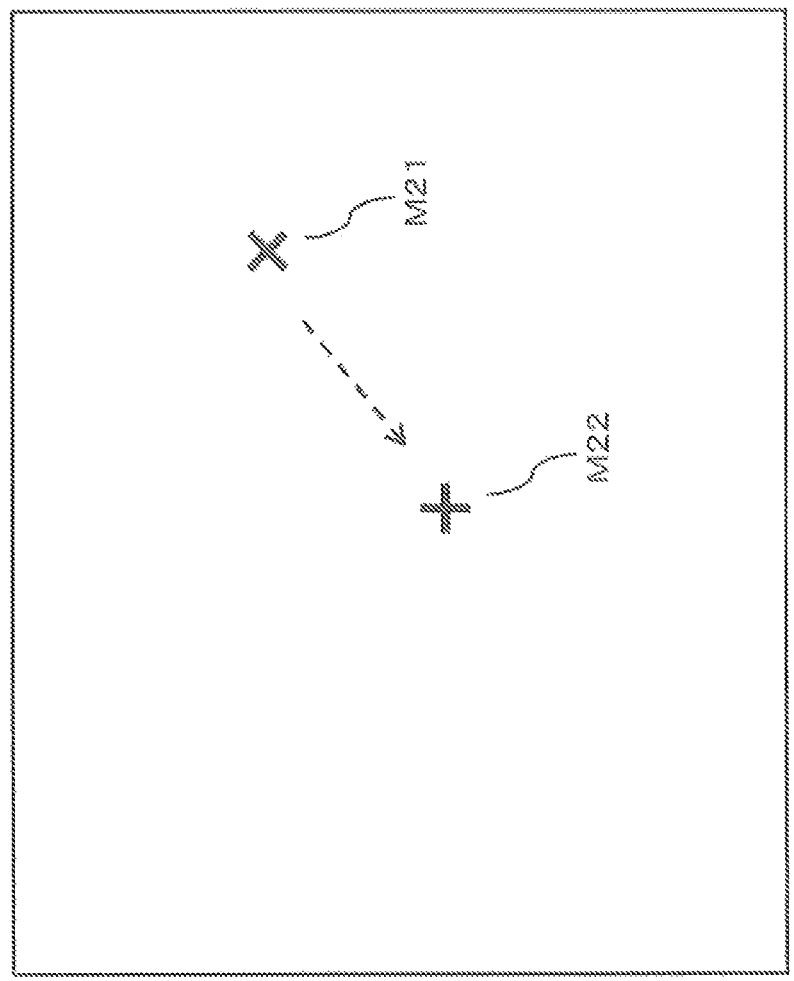
FIG. 21 is a schematic diagram for describing another example of guide figure.

Alternatively, the guide figure displayed by the projector of NG position may include two marks that can suggest the direction to move the projector of NG position to the user, as illustrated in FIG. 21, In the example of FIG. 21, the guide figure suggests that the projector of NG position needs to be moved in a direction from a mark M21 to a mark M22. In this case, the projector of OK position does not need to display the reference cursor M1.

The above described first embodiment discloses the technical idea described below. The projectors 101-103 described in the first embodiment are an example of the projection-type display apparatus. The adjusting PC 200 is an example of the control apparatus. The CPU 202 of the adjusting PC 200 is an example of a first controller, a second controller, an assigned projection region setting unit, a projectable region detection unit, and a determination unit. The figures illustrated in FIG. 17A to FIG. 21 are examples of the guide figure and the reference graphic. It is noted that parenthesized reference signs shown below are provided for easier understanding of correspondence between the respective elements shown below and the elements described with the reference sings in the first embodiment. The parenthesized reference signs are not intended to limit elements shown below to the elements in the first embodiment denoted by the reference signs.

(1) A projection image display system (1) which forms an image on a projection plane (400) by using a plurality of images projected from a plurality of projection-type display apparatuses, wherein the plurality of projection-type display apparatuses (101-103) include a first projection-type display apparatus which is assigned displaying of an image in a first assigned projection region on the projection plane, and a second projection-type display apparatus which is assigned displaying of an image in a second assigned projection region which partially overlaps the first assigned projection region, and the projection image display system (1) includes a first controller (202, S900) and a second controller (202, S900).

The first controller (202, S900) is configured to generate a guide figure and controls the first projection-type display apparatus to display the guide figure when a first projectable region does not contain the first assigned projection region (NG position), the first projectable region being a region on a projection plane, in which the first projection-type display apparatus can actually project an image. The second controller (202, S900) is configured to generates a reference figure and controls the second projection-type display apparatus to display the reference figure when a second projectable region contains the second assigned projection region (OK position), the second projectable region being a region on a projection plane, in which the second projection-type display apparatus can actually project an image.

The guide figure is a figure to be referenced by a user for adjusting the position of the first projection-type display apparatus, and the reference figure is a figure to be referenced by the user, as a norm for the position adjustment, in combination with the guide figure (see FIGS. 17A-21).

With that configuration, the user can easily identify the projector that needs the position adjustment by referencing the guide figure. Further, since the guide figure and the reference figure to be aligned with the guide figure are simultaneously displayed on the screen, the operator can easily recognize the position of the projector to be corrected, so that the burden of the user in work of position adjustment can be reduced.

(2) The projection image display system (1) may further include an assigned projection region setting unit configured to set an assigned projection region that is a region on a projection plane and is to be assigned, to each, of the projection-type display apparatuses;

a projectable region detection unit configured to detect a projectable region that is a region on a projection plane in which each projection-type display apparatus can actually project an image; and a determination unit configured to determine whether the projectable region contains the assigned projection region.

(3) In the projection image display system (1), the guide figure may include an indication (F2) indicating the first projectable region, and the reference figure may include an indication (L) indicating the boundary of an overlapping region of the first assigned projection region and the second assigned projection region. By referencing the guide figure and the reference figure, the user can carry out the position adjustment of the first projection-type display apparatus.

(4) In the projection image display system (1), the guide figure may contain a first mark (M2). The reference figure may contain a second mark (M1) arranged in an overlapping region between the first assigned projection region and the second assigned projection region. The second mark (M1) is referenced by the user in combination with the first mark for the position adjustment. By referencing the first mark and the second mark, the user can carry out the position adjustment of the first projection-type display apparatus.

(5) An image display method for a projection image display system (1) configured to form an image on a projection plane (400) by using a plurality of projection-type display apparatuses, wherein the plurality of projection-type display apparatuses (101-103) include a first projection-type display apparatus which is assigned displaying of an image in a first assigned projection region on the projection plane, and a second projection-type display apparatus which is assigned displaying of an image in a second assigned projection region which partially overlaps the first assigned projection region, the image display method includes:

a step (S900) of controlling the first projection-type display apparatus to display a guide figure when a first projectable region does not contain the first assigned projection region, the first projectable region being a region on a projection plane, in which the first projection-type display apparatus can actually project an image; and a step (S900) of controlling the second projection-type display apparatus to display a reference figure when a second projectable region contains the second assigned projection region, the second projectable region being a region on a projection plane, in which the second projection-type display apparatus can actually project an image.

The guide figure is a figure to be referenced by a user for adjusting the position of the first projection-type display apparatus, and the reference figure is a figure to be referenced by the user, as a norm for the position adjustment, in combination with the guide figure.

(6) The image display method may further include:
capturing an image of the projection plane by an imaging apparatus;
obtaining the captured image and setting an assigned projection region for each projection-type display apparatus based on the captured image;
projecting a predetermined test pattern on the projection plane by each of the projection-type display apparatuses;
capturing an image of the test pattern projected by each of the projection-type display apparatuses on the projection plane, by the imaging apparatus; and
detecting a projectable region of each of the projection-type display apparatuses based on the captured image of the test pattern.

(7) A projection-type display apparatus (101-103) which forms an image on a projection plane (400) in cooperation with at least one other projection-type display apparatus and is assigned displaying of an image on a partial region of the formed image, the projection-type display apparatuses including:
a generation unit (180) configured to generate a guide figure that is referenced by a user for adjusting the position of the projection-type display apparatus when a projectable region does not contain an assigned projection, the projectable region being a region on the projection plane in which the project-ion-type display apparatus can actually project an image, the assigned projection region being a region on the projection plane assigned to the projection-type display apparatus; and
a projection unit (110, 120) configured to project the guide figure on the projection plane.

(8) A control apparatus (200) in a projection image display system (1) which forms an image on a projection plane (400) by using a plurality of images projected from a plurality of projection-type display apparatuses, wherein
the plurality of projection-type display apparatuses (101-103) include a first projection-type display apparatus which is assigned displaying of an image in a first assigned projection region on the projection plane, and a second projection-type display apparatus which is assigned displaying of an image in a second assigned projection region which partially overlaps the first assigned projection region, and
the control apparatus (200) includes a first, controller (202) and a second controller (202).

The first, controller (202) is configured to send, a commmand for displaying a guide figure to the first projection-type display apparatus when a first projectable region does not contain the first assigned projection region, the first projectable region being a region on a projection plane, in which the first projection-type display apparatus can actually project an image.

The second controller (202) is configured to send a command for displaying a reference figure to the second projection-type display apparatus when a second projectable region contains the second assigned projection region, the second projectable region being a region on a projection plane, in which the second projection-type display apparatus can actually project an image.

The guide figure is a figure to be referenced by a user for adjusting the position of the first projection-type display apparatus, and the reference figure is a figure to be referenced by the user, as a norm for the position adjustment, in combination with the guide figure.

(9) A recording medium storing a control program for a projection image display system (1) which forms an image on a projection plane (400) by using a plurality of images projected from a plurality of projection-type display apparatuses, wherein
the plurality of projection-type display apparatuses (101-103) include a first projection-type display apparatus which is assigned displaying of an image in a first assigned projection region on the projection plane, and a second projection-type display apparatus which is assigned displaying of an image in a second assigned projection region which partially overlaps the first assigned projection region. The control program causes a compute to: control (S900) the first projection-type display apparatus to display a guide figure when a first projectable region does not contain the first, assigned projection region, the first projectable region being a region on a projection plane, in which the first projection-type display apparatus can actually project an image; and control (S900) the second projection-type display apparatus to display a reference figure when a second projectable region contains the second assigned projection region, the second projectable region being a region on a projection plane, in which the second projection-type display apparatus can actually project an image.

The guide figure is a figure to be referenced by a user for adjusting the position of the first projection-type display apparatus, and the reference figure is a figure to be referenced by the user, as a norm for the position adjustment, in combination with the guide figure.

As described above, the embodiments have been described as examples of the art in the present disclosure. For that purpose, the accompanying drawings and the detailed description have been provided.

Therefore, the constituent elements shown in the accompanying drawings or described in the detailed description may include not only necessary elements to solve the problem but also unnecessary elements to solve the problem, in order to exemplify the art. Accordingly, it should not be instantly understood that the unnecessary element is necessary only because it is shown in the accompanying drawings or described in the detailed description.

Also, since the above described embodiments are for exemplifying the art of the present disclosure, the embodiments may be subjected to various kinds of modification, substitution, addition, omission, or the like without departing from the scope of the claims and their equivalents.

INDUSTRIAL APPLICABILITY

The present disclosure can be applied to an image display system using a projection-type display apparatus.

The invention claimed is:

1. A projection image display system which forms an image on a projection plane by using a plurality of images projected from a plurality of projection-type display apparatuses, wherein
the plurality of projection-type display apparatuses comprise a first projection-type display apparatus which is assigned displaying of an image in a first assigned projection region on the projection plane, and a second projection-type display apparatus which is assigned displaying of an image in a second assigned projection region which partially overlaps the first assigned projection region, and
the projection image display system comprises a first controller and a second controller,
the first controller is configured to generate a guide figure and controls the first projection-type display apparatus to display the guide figure when a first projectable region does not contain the first assigned projection region, the first projectable region being a region on a projection plane, in which the first projection-type display apparatus can actually project an image, the second controller is configured to generates a reference figure and controls the second projection-type display apparatus to display the reference figure when a second projectable region contains the second assigned projection region, the second projectable region being a region on a projection plane, in which the second projection-type display apparatus can actually project an image, the guide figure is a figure to be referenced by a user for adjusting the position of the first projection-type display apparatus, and the reference figure is a figure to be referenced by the user, as a norm for the position adjustment, in combination with the guide figure.

2. The projection image display system according to claim 1 further comprising an assigned projection region setting unit configured to set an assigned projection region that is a region on a projection plane and is to be assigned to each of the projection-type display apparatuses, a projectable region detection unit configured to detect a projectable region that is a region on a projection plane in which each projection-type display apparatus can actually project an image, and a determination unit configured to determine whether the projectable region contains the assigned projection region.

3. The projection image display system according to claim 1, wherein the guide figure includes an indication indicating the first projectable region, and the reference figure includes an indication indicating the boundary of an overlapping region of the first assigned projection region and the second assigned projection region.

4. The projection image display system according to claim 1, wherein the guide figure includes a first mark, the reference figure includes a second mark arranged in an overlapping region between the first assigned projection region and the second assigned projection region, and the second mark is referenced by the user in combination with the first mark for the position adjustment.

5. An image display method for a projection image display system for forming an image on a projection plane by using a plurality of projection-type display apparatuses, wherein the plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region, the image display method comprises:

controlling the first projection-type display apparatus to display a guide figure when a first projectable region does not contain the first assigned projection region, the first projectable region being a region on a projection plane, in which the first projection-type display apparatus can actually project an image; and controlling the second projection-type display apparatus to display a reference figure when a second projectable region contains the second assigned projection region, the second projectable region being a region on a projection plane, in which the second projection-type display apparatus can actually project an image, the guide figure is a figure to be referenced by a user for adjusting the position of the first projection-type display apparatus, and the reference figure is a figure to be referenced by the user, as a norm for the position adjustment, in combination with the guide figure.

6. The image display method according to claim 5, further comprising capturing an image of the projection plane by an imaging apparatus;

obtaining the captured image and setting an assigned projection region for each projection-type display apparatus based on the captured image;

projecting a predetermined test pattern on the projection plane by each of the projection-type display apparatuses;

capturing an image of the test pattern projected by each of the projection-type display apparatuses on the projection plane, by the imaging apparatus; and detecting a projectable region of each of the projection-type display apparatuses based on the captured image of the test pattern.

7. A projection-type display apparatus which forms an image on projection plane in cooperation with at least one other projection-type display apparatus and is assigned displaying of an image on a partial region of the formed image, the projection-type display apparatus and the other projection-type display apparatus each having a projectable region that is a region on the projection plane in which each projection-type display apparatus can actually project an image, and an assigned projection region that is a region on the projection plane assigned to each projection-type display apparatus, the projection-type display apparatus including:

a generation unit configured to generate a reference figured, when the projectable region of the projection-type display apparatus contains an assigned projection region of the projection-type display apparatus and when the projectable region of the other projection-type display apparatus adjacent to the projection-type display apparatus does not contain the assigned projection region of the other adjacent projection-type display apparatus, or generate a guide figure that is referenced together with a reference figure of the other projection-type display apparatus by a user for adjusting the position of the projection-type display apparatus, when the projectable region of the projection-type display apparatus does not contain the assigned projection region of the projection-type display apparatus; and a projection unit configured to projection the reference figure or the guide figure on the projection plane.

8. A control apparatus in a projection image display system which forms an image on a projection plane by using a plurality of images projected from a plurality of projection-type display apparatuses, wherein the plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region, the control apparatus comprises a first controller and a second controller, the first controller is configured to send a command for displaying a guide figure to the first projection-type display apparatus when a first projectable region does not contain the first assigned projection region, the first projectable region being a region on a projection plane, in which the first projection-type display apparatus can actually project an image, and the second controller is configured to send a command for displaying a reference figure to the second projection-type display apparatus when a second projectable region contains the second assigned projection region, the second projectable region being a region on a projection plane, in which the second projection-type display apparatus can actually project an image, the guide figure is a figure to be referenced by a user for adjusting the position of the first projection-type display apparatus, and the reference figure is a figure to be referenced by the user, as a norm for the position adjustment, in combination with the guide figure.

9. A non-transitory recording medium storing a control program for a projection image display system which forms an image on a projection plane by using a plurality of images projected from a plurality of projection-type display apparatuses, wherein the plurality of projection-type display apparatuses include a first projection-type display apparatus which is assigned displaying of an image in a first assigned projection region on the projection plane, and a second projection-type display apparatus which is assigned displaying of an image in a second assigned projection region which partially overlaps the first assigned projection region, and the control program causes a computer to:

control the first projection-type display apparatus to display a guide figure when a first projectable region does not contain the first assigned projection region, the first projectable region being a region on a projection plane, in which the first projection-type display apparatus can actually project an image; and control the second projection-type display apparatus to display a reference figure when a second projectable region contains the second assigned projection region, the second projectable region being a region on a projection plane, in which the second projection-type display apparatus can actually project an image, the guide figure is a figure to be referenced by a user for adjusting the position of the first projection-type display apparatus, and the reference figure is a figure to be referenced by the user, as a norm for the position adjustment, in combination with the guide figure.

* * * * *